US012583976B2

(12) United States Patent
Adams et al.

(10) Patent No.: US 12,583,976 B2
(45) Date of Patent: Mar. 24, 2026

(54) RAPID RECOVERY SILICONE GELS

(71) Applicant: COMMSCOPE TECHNOLOGIES LLC, Hickory, NC (US)

(72) Inventors: Gary William Adams, Holly Springs, NC (US); Matthew Peter Galla, Holly Springs, NC (US)

(73) Assignee: Commscope Technologies LLC, Hickory, NC (US)

( * ) Notice: Subject to any disclaimer, the term of this patent is extended or adjusted under 35 U.S.C. 154(b) by 966 days.

(21) Appl. No.: 17/782,107

(22) PCT Filed: Nov. 23, 2020

(86) PCT No.: PCT/US2020/061839
§ 371 (c)(1),
(2) Date: Jun. 2, 2022

(87) PCT Pub. No.: WO2021/113109
PCT Pub. Date: Jun. 10, 2021

(65) Prior Publication Data

US 2023/0029980 A1 Feb. 2, 2023

Related U.S. Application Data

(60) Provisional application No. 63/013,992, filed on Apr. 22, 2020, provisional application No. 62/942,594, filed on Dec. 2, 2019.

(51) Int. Cl.
*C08J 3/075* (2006.01)
*C08G 77/20* (2006.01)
*C09K 3/10* (2006.01)

(52) U.S. Cl.
CPC .............. *C08G 77/20* (2013.01); *C08J 3/075* (2013.01); *C09K 3/1018* (2013.01)

(58) Field of Classification Search
None
See application file for complete search history.

(56) References Cited

U.S. PATENT DOCUMENTS 4,852,646 A * 8/1989 Dittmer .................. C08K 3/013 174/76
5,079,300 A * 1/1992 Dubrow .................. C08L 83/04 528/25
5,290,826 A 3/1994 Palmer
5,679,734 A 10/1997 Peccoux et al.
5,886,111 A * 3/1999 Chiotis .................. C08L 83/04 525/464
6,030,919 A 2/2000 Lewis
8,642,891 B2 * 2/2014 Berghmans .......... G02B 6/3849 174/521
9,556,336 B2 1/2017 Berghmans et al.
2011/0300766 A1 12/2011 Carbary et al.
2012/0320535 A1 * 12/2012 Berghmans .......... G02B 6/3849 361/728
2012/0322942 A1 12/2012 Berghmans et al.
2013/0053486 A1 2/2013 Dower
2015/0259585 A1 9/2015 Tasaki et al.
2021/0373267 A1 * 12/2021 Radelet ................ H02G 15/013
2022/0131355 A1 * 4/2022 Allen ..................... G02B 6/445

FOREIGN PATENT DOCUMENTS

JP 4-503825 A 7/1992
JP 9-328552 A 12/1997
JP 2002-298976 A 10/2002
JP 2007-527439 A 9/2007
JP 2017-226832 A 12/2017
WO 2020/172606 A1 8/2020

OTHER PUBLICATIONS

Datasheet for CAT-50 (vinyl platinum catalyst) by Avantor, 2 pages, 2018. (Year: 2018).*
International Search Report and Written Opinion of the International Searching Authority for International Patent Application No. PCT/US2020/061839 mailed Mar. 26, 2021, 11 pages.
"Silicone Fluids" Stable Inert Media, Engineering and Design Properties for: Heat Transfer, Mechanical, Lubrication, Smart Fluid, Dielectric and Optical Applications, Gelest, 1-31 (2012).
SIT7278.0—Tetrakis(Dimethylsiloxy) Silane, Safety Data Sheet, Gelest, 1-6 (2014).
Aerosil® R 8200 for Silicone Rubber, Fumed silica with high reinforcing properties and a particularly low thickening effect, Evonik Industries, 1-8 (2015).
DMS-T23—Polydimethylsiloxane, Trimethylsiloxy Terminated, Safety Data Sheet, Gelest, 1-6 (2016).
DMS-H03—Hydride Terminated Polydimethylsiloxane, Safety Data Sheet, Gelest, 1-6 (2019).
Japanese Office Action for Application No. 2022-533198 mailed Dec. 17, 2024.
Extended European Search Report for EP 20897438.6, dated Nov. 14, 2023, 7 pages.

* cited by examiner

*Primary Examiner* — Robert S Loewe
(74) *Attorney, Agent, or Firm* — Merchant & Gould, P.C.

(57) ABSTRACT

Sealants are provided, including silicone gels, compositions, and methods of making, for use in sealing telecommunications closures. The silicone gels are capable of sealing and resealing rapidly, for example, within 5 minutes after closing.

17 Claims, 3 Drawing Sheets

RAPID RECOVERY SILICONE GELS

CROSS-REFERENCE TO RELATED APPLICATIONS

This application is a National Stage Application of PCT/US2020/061839, filed on Nov. 23, 2020, which claims the benefit of U.S. Patent Application Ser. No. 62/942,594, filed on Dec. 2, 2019, and claims the benefit of U.S. Patent Application Ser. No. 63/013,992, filed on Apr. 22, 2020, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures and interconnect systems integrated throughout the network of telecommunications cables. Telecommunications enclosures and interconnect systems are typically sealed to inhibit the intrusion of moisture or other contaminants. Silicone gels are thermoset gels that exhibit desirable physical properties for use as sealants in closure or interconnect systems.

For example, U.S. Pat. Nos. 8,642,891 and 9,556,336, Berghmans et al., disclose silicone dry gels suitable for use in closure or interconnect systems. Silicone dry gels were developed without use of a silicone oil to help avoid excessive oil bleed out. Silicone dry gels may be prepared from a vinyl-terminated polydimethylsiloxane (PDMS), a hydride containing crosslinker, and a hydride containing chain extender, for example, wherein the dry silicone gel has a hardness between 100 g and 300 g. The target hardness is needed to make the gel functional from its sealing perspective.

One problem with silicone dry gels is that they exhibit long relaxation times and likely a broad spectrum distribution of relaxation times as well. Silicone dry gels exhibit a relatively slow response when the gel is formed into a gel block and placed in a closure system. This means that the closure does not seal quickly after closing. It is typical for the closure employing a silicone dry gel to require up to 15 minutes or more to seal to 20 kPa and in some cases (dependent on cable sizes, combinations and configurations) it could require up to 2 hours for the closure to seal. It is desirable to provide a silicone gel for use in closures capable of sealing and resealing as rapidly as possible, preferably within 5 minutes after closing.

SUMMARY OF THE INVENTION

Sealants are provided including silicone gels, compositions, and methods of making for use in sealing telecommunications closures and interconnect systems. The silicone gels are capable of sealing and resealing rapidly, for example, within 5 minutes after closing.

A method of making a silicone gel is provided comprising: providing a first set of components comprising: (1) a base polymer having a vinyl-silicone group, (2) an addition cure catalyst, and optionally (3) a non-reactive silicone oil; providing a second set of components comprising: (1) a crosslinker, (2) additional base polymer having a vinyl-silicone group, and optionally (3) a non-reactive silicone oil; mixing the first and second set of components together to form a silicone gel composition; molding and curing the silicone gel composition to form the silicone gel. The second set of components may further comprise a chain extender.

The silicone gel composition includes 10-60 wt %, 20-55 wt %, or 30-50 wt % of the non-reactive silicone oil. The first and/or second set of components comprises the non-reactive silicone oil.

The non-reactive silicone oil may be a trimethylsiloxy-terminated or silanol-terminated polydialkylsiloxane. The non-reactive silicone oil may have a viscosity of 10-30,000 cSt (10 -30,000 mm2/s), 20-5,000 cSt (20-5,000 mm2/s), 50-1,000 cSt (50-1,000 mm2/s), or 50-350 cSt (50-350 mm2/s).

The base polymer and additional base polymer may each be a vinyl-terminated polydimethylsiloxane. The base polymer and additional base polymer may each have one or more of the following properties: (a) a molecular weight between 6,000 g/mol and 170,000 g/mol; (b) a viscosity between 100 mm2/s and 165,000 mm2/s; and (c) a vinyl content between 0.01 eq/kg and 0.1 eq/kg. The silicone gel composition may include the base polymer and additional base polymer in an amount between 40-90 wt %, between 45-80 wt %, or between 50-65 wt %.

The crosslinker may have >2 or <10 Si—H hydride moieties per molecule. The crosslinker may have three or four Si—H hydride moieties per molecule. The crosslinker may be selected from the group consisting of tetrakis (dimethylsiloxy)silane, methyltris(dimethylsiloxy)silane, phenyltris(dimethylsiloxy)silane and combinations thereof.

The chain extender may have two Si—H hydride moieties per molecule. In the silicone gel composition, the mole fraction hydride present as crosslinker (MFHC) may be from about 0.2 to about 0.5, or from about 0.3 to about 0.4. In the silicone gel composition, the hydride to vinyl ratio may be between about 0.8 and 1.0.

The chain extender may be a hydride containing polydimethylsiloxane, hydride terminated polydimethylsiloxane, hydride terminated polyphenylmethylsiloxane, hydride terminated polydiphenylsiloxane, a functionalized hydride terminated silicone, and combinations thereof.

The catalyst may be selected from the group consisting of platinum complexed with divinyltetramethyldisiloxane and rhodium chloride complex.

The weight percent ratio between the first set of components and the second set of components may be between approximately 47.5:52.5 and 52.5:47.5, 49:51 and 51:49, or about 50:50.

The weight ratio between the first set of components and the second set of components may be between approximately 1.10:1.0 and 1.0:1.10, 1.05:1.0 and 1.0:1.05, or about 1:1.

The extended silicone gels of the disclosure after being under compression at 70° C. for at least 56 days exhibit a compression set of <12%, <10%, <5%, or <4% or from 0 to 12%, 0 to 5%, or 0 to 4% after 24 hr recovery time at room temperature.

The extended silicone gels of the disclosure after being under compression at 70° C. for at least 56 days exhibit <20%, <15%, or <12%, or from 0 to 20%, 2 to 20%, or 4 to 12% compression set after 5 min recovery time at room temperature.

The silicone gel may exhibit one or more of the following properties: (a) a hardness between 50 g and 200 g, or 60 and 150 g; (b) a stress relaxation between 40% and 60% when the gel is subjected to a deformation of 50% of its original size; (c) a compression set between 2% and 20% after 50% strain has applied to the gel for 1000 hours at 70° C.; (d) a compression set recovery of no more than 12% compression set after 5 min; (e) no more than 15% oil bleed out after being under compression of 1.2 atm for 21 days at 70° C.; (f) a H6Os hardness of from 80g to 120 g; (g) a residual indentation hardness ranging from 20 g-150 g; (h) a compression set of less than 10% after 30, 20 or 10 minutes of recovery time; (i) an elongation to failure of at least 500%; (j) a resistance to extrusion having a measured volume of no more than 0.5 $cm^3$; and/or (k)an oil bleed-out of less than 20% or 15% after 21 days at 120 kPa.

A silicone gel is provided that is prepared from a silicone gel composition comprising: a base polymer having a vinyl-silicone group; a catalyst; a crosslinker; and a non-reactive silicone oil, and the silicone gel composition may further comprises a chain extender.

The non-reactive silicone oil may be a trimethylsiloxy-terminated or silanol-terminated polydialkylsiloxane. The non-reactive silicone oil may be a trimethylsiloxy-terminated polydimethylsiloxane. The non-reactive silicone oil may have viscosity of between about 10 -30,000 cSt (10 -30,000 mm2/s), 20-5,000 cSt (20-5,000 mm2/s), 50-1,000 cSt (50-1,000 mm2/s), or 50-350 cSt (50-350 mm2/s). The silicone gel composition may include between about 10-60 wt %, 20-55 wt %, or 30-50 wt % of the non-reactive silicone oil. The base polymer and additional base polymer may each be a vinyl-terminated polydimethylsiloxane. The base polymer and additional base polymer each may have one or more of the following properties: (a) a molecular weight between 6,000 g/mol and 170,000 g/mol; (b) a viscosity between 100 mm2/s and 165,000 mm2/s; and (c) a vinyl content between 0.01 eq/kg and 0.1 eq/kg.

A closure or interconnect system is provided comprising a silicone gel as provided herein, wherein the closure or interconnect system is capable of sealing within 5 minutes after opening and closing to reseal to 20 kPa pressure.

A sealant is provided for use in an enclosure to seal cable entry/exit locations, the sealant comprising a sealant material having: a residual indentation hardness ranging from 20 g-150 g; a compression set of less than 10% after 30, 20 or 10 minutes of recovery time; an elongation to failure of at least 500%; a resistance to extrusion having a measured volume of no more than 0.5 $cm^3$; and an oil bleed-out of less than 20% or 15% after 21 days at 120 kPa. The sealant material may be a thermoset material. The sealant may be a silicone gel prepared from a silicone gel composition comprising: a base polymer having a vinyl-silicone group; a catalyst; a crosslinker; a chain extender; and a non-reactive silicone oil.

DETAILED DESCRIPTION OF THE INVENTION

Figure 1:
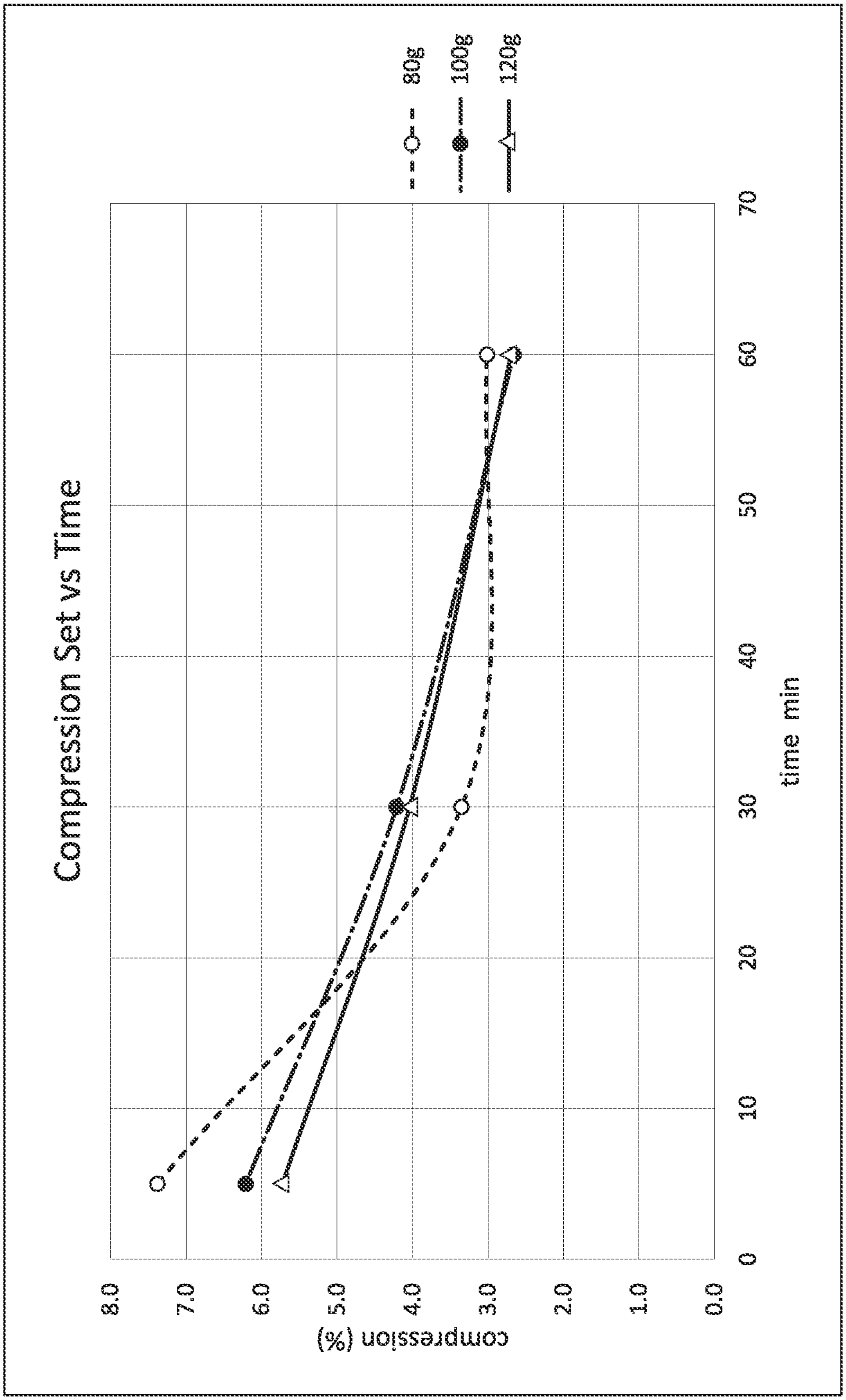
FIG. 1 shows a graph of Compression Set versus recovery time for silicone gels of the disclosure having three different hardness values of 80 g (A), 100 g (B), or 120 g (C). Each of the three gels exhibits rapid recovery of compression set to no more than 10% within 5 minutes, and no more than 5% within 30 minutes. Closures made using the prior art silicone dry gel formulations failed this test, typically requiring up to 2 hours after opening and closing to reseal to 20 kPa pressure.

Compositions and methods are provided for preparing silicone gels suitable for use as sealants in closure and interconnect systems. The silicone gels seal and reseal rapidly (within minutes) after closing. In contrast to prior art silicone dry gels, the silicone gels of the disclosure exhibit rapid recovery of compression set to no more than 10% within 5 minutes, and no more than 5% within 30 minutes.

In certain implementations, sealant material for use in applications of the type disclosed herein includes a hydrosilation cured vinyl-terminated polydimethylsiloxane (PDMS) gel. Additional information on such a gel can be found in U.S. Pat. No. 8,642,891, the disclosure of which is hereby incorporated herein by reference in its entirety. In one example, the gel can be made by reacting a cross-linker, a chain extender and a vinyl-terminated polydimethylsiloxane (PDMS). In other implementations, sealant material for use in applications of the type disclosed herein include peroxide or heat cured vinyl-terminated PDMS gel. In other implementations, sealant material for use in applications of the type disclosed herein includes moisture (and/or UV) cured PDMS gel (various terminations possible, including silanol). In other implementations, sealant material for use in applications of the type disclosed herein includes moisture (and/or UV) cured, silylated polyether (commonly "MS polymer") gel. In certain implementations, the gel material includes polyether or polyester based polyurethane gel. In other implementations, sealant material for use in applications of the type disclosed herein includes chemically crosslinked polyacrylate (acrylic or methacrylic) e.g. n-butyl acrylate or ethyl-hexyl acrylate with triethylene glycol dimethacrylate. In other implementations, sealant material for use in applications of the type disclosed herein includes ionically or chemically crosslinked rubber gel. In other implementations, sealant material for use in applications of the type disclosed herein includes chemically crosslinked styrene-butadiene-styrene (SBS) family thermo-plastic elastomer (TPE) gel (crosslinks in polystyrene phase only). In other implementations, sealant material for use in applications of the type disclosed herein includes physically crosslinked triblock polyacrylate gel (e.g. Kurarity®). In other implementations, sealant material for use in applications of the type disclosed herein includes physically crosslinked triblock olefin gel (e.g. Infuse). In other implementations, sealant material for use in applications of the type disclosed herein includes hybrids and/or multiple combinations of above chemistries.

Silicone gel compositions are provided for preparing silicone gels for use in sealing closure or interconnect systems.

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular aspect of the present invention.

As used herein, the terms "comprise(s)," "include(s)," "having," "has," "contain(s)," and variants thereof, are intended to be open-ended transitional phrases, terms, or words that do not preclude the possibility of additional acts or structure.

Any concentration range, percentage range, or ratio range recited herein are to be understood to include concentrations, percentages, or ratios of any integer within that range and fractions thereof, such as one tenth and one hundredth of an integer, unless otherwise indicated. Also, any number range recited herein relating to any physical feature are to be understood to include any integer within the recited range, unless otherwise indicated.

The terms "a" and "an" as used above and elsewhere herein refer to "one or more" of the enumerated components. For example, "a" polymer refers to one polymer or a mixture comprising two or more polymers.

The term "and/or" refers to and encompasses any and all possible combinations of one or more of the associated listed items.

As used herein, the term "about" means within ten percent (10%) of the given value, either ten percent more than the given amount or ten percent less than the given amount, or both.

As used herein, the term "composition" refers to one or more of a compound, mixture, blend, alloy, polymer and/or copolymer.

The term "room temperature" is defined as 15 to 25 deg C., unless otherwise specified.

The term "centiStokes" ($mm^2/s$, cSt) may be used as a measure of kinematic viscosity. Viscosity is a measurement of a fluids resistance to flow. Kinematic viscosity differs from viscosity in that it is the measure of volume flow of a liquid, defined as a stoke (St). A stoke equals 1 cm2/sec or 10-4 m2/sec. A centistoke, cSt =0.01 St=1 mm2/sec. Kinematic viscosity of a liquid (stokes) can be converted to viscosity (poise) by multiplying by the density of the fluid. Unless otherwise specified, viscosity values reported herein (cSt or $mm^2/s$) are for kinematic viscosity measured at 25° C. The dynamic viscosity and density may be measured by ASTM D7042 test method. Kinematic viscosity values reported herein may be ±10% for fluids ≤100,000 cSt and ±15% for fluids >100,000 cSt.

The term "centipoise" ($10^{-3}$N s/m2, cP) may be used as a measure of absolute viscosity. Perfect or ideal fluids offer no resistance to shear and have zero consistency. Consistency is the resistance offered by a real fluid to deformation. Viscosity dimensions are force per area x time. The unit of viscosity is the poise (p)=1 g/(cm)(s) and is a measure of mass flow of a liquid. One poise is equal to 0.1 Pa·s in SI units. Conversion of absolute (dynamic) viscosity to kinematic viscosity depends on fluid density. Values of cSt from 1-200,000 may be similar to cP for fluids having density like water, or specific gravity of 1.

As provide herein, ranges are intended to include, at least, the numbers defining the bounds of the range.

Unless otherwise specified, % values refer to weight %.

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this disclosure belongs. In the event of conflicting terminology, the present specification is controlling. All patents, patent applications and publications referred to herein are incorporated by reference in their entirety.

As used herein, the term "silicone gel" refers to a chemically crosslinked polymer having a Si—O backbone. As opposed to carbon-based polymers, the crosslinked silicone polymers of silicone dry gels are based on a Si—O backbone. The characteristics of silicon and oxygen provide crosslinked polymers with their exceptional properties. For example, silicon forms stable tetrahedral structures, and silicon-oxygen bonds are relatively strong which results in silicone gels with high temperature resistance. In addition, crosslinked Si—O polymers have a relatively high chain flexibility as well as low rotational energy barrier.

As used herein, the term "silicone oil gel" may refer to a silicone gel having a chemically crosslinked polymer with a Si—O backbone and comprising an amount of added non-reactive diluent fluids such as silicone oil or mineral oil.

As used herein, the term "silicone dry gel" may refer to a chemically crosslinked polymer having a Si—O backbone and comprising a relatively low amount, or no amount at all, of added diluent fluids such as silicone oil or mineral oil.

Closure systems are used to protect internal components from degradation caused by external environments. For example, internal components such as fiber optic cables and copper cables are often enclosed in closure systems. Other closure systems are commercially available for use with communication and energy transmission cables. Closure systems typically include internal components such as fiber organizers, cable seals and termination devices, drop cable seals for a number of drops with drop cable termination devices, and universal splice holders for a number of splices. These internal components may be subject to environmental factors such as varying moisture levels, heat and cold, and exposure to other chemical substances. The closure systems are preferably protected from damage with a sealant of some sort.

Sealants are often used in closure systems for insulation and for protection against water, corrosion and environmental degradation, and for thermal management. Sealants suitable or closure systems may include thermoplastic gels or thermoset gels. Thermoset gels such as silicone gels or polyurethane gels may be employed in closure systems. Thermoset gels can be produced by chemical crosslinking.

The silicone gels of the disclosure may be made according to a number of different polymerization reactions with further addition of a non-reactive silicone oil. The polymerization reaction may be a hydrosilylation reaction, also referred to as a hydrosilation reaction. The hydrosilylation reaction may makes use of a platinum catalyst, while other embodiments make use of radicals. In further embodiments, the silicone gel is made by a dehydrogenated coupling reaction. In other embodiments, the silicone gel is made by a condensation cure RTV reaction.

The silicone gel may be made by reacting at least a crosslinker, a chain extender, and a base polymer (e.g., a vinyl-terminated polydimethylsiloxane) in the presence of non-reactive silicone oil. A catalyst may be included to speed up the reaction. In additional embodiments, an inhibitor may be used to slow down the rate of reaction. Exemplary components of the silicone gels, their resulting properties, and their end-use are described in greater detail below.

The silicone gel may be made by an addition cure or platinum cure reaction mechanism. In some embodiments, the mechanism employs the use of a catalyst. By using a catalyst, the activation energy of the reaction is lowered and faster curing times at lower temperatures can be achieved. A schematic overview of the platinum cure reaction mechanism is shown below in (I).

(I)

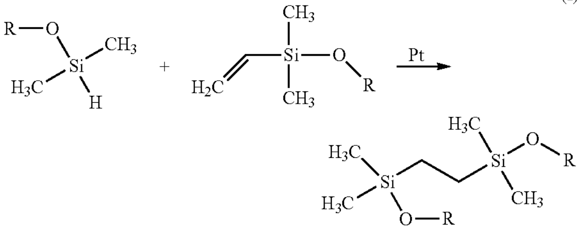

For the reaction in (I) to be made possible, two functional groups must react with each other. In certain embodiments, the two functionalities are (1) the Si—H group and (2) the Si-vinyl group. These two functionalities may be provided by: (1) a base polymer, (2) a crosslinker, and (3) a chain extender.

Base Polymer

The Si-vinyl group may be provided by a base polymer such as a vinyl terminated polydimethylsiloxane (otherwise referred to as "V-PDMS"), which is shown below in (II). In this example, the base polymer compound comprises a vinyl group at each end of the compound.

(II)

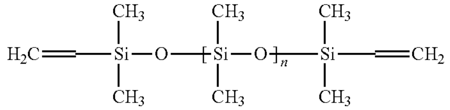

The molecular weight of the base polymer may be controlled through anionic ring-opening polymerization of cyclic siloxanes in the presence of alkali-metal hydroxide of a base that is volatile (e.g., tetramethylammonium silanolate). Endcapping of the PDMS with a vinyl group may be needed, so these groups are added to the polymerization mixture. V-PDMS together with the chain extender may be used to determine the molecular weight between the different crosslink sites.

The vinyl-containing base polymer, such as V-PDMS, may have different viscosities that affect the resulting silicone gel. In general, a high molecular weight V-PDMS may produce an uncured gel with a higher viscosity. In certain embodiments, a low molecular weight V-PDMS may improves processability.

The V-PDMS used in the silicone gel may have a viscosity between approximately 100 and 165,000 cSt (100-165,000 $mm^2/s$), between approximately 1000 and 100,000 cSt (1000-100,000 mm2/s), between approximately 1000 cSt and 60,000 cSt (1000-60,000 $mm^2/s$), between approximately 3000 cSt and 7000 cSt (3000-7000 $mm^2/s$), or between approximately 4500 cSt and 5500 cSt (4500-5500 $mm^2/s$).

The vinyl-terminated polydimethylsiloxane may have an average molecular weight between about 6,000 g/mol and about 170,000 g/mol, between about 28,000 g/mol and about 72,000 g/mol. The vinyl-terminated polydimethylsiloxane may have an average molecular weight of approximately 49,500 g/mol.

The base polymer may contain between approximately 1 and 10 mol of vinyl per 500,000 g/mol of V-PDMS. In one embodiment, the base polymer contains approximately 2 mol of vinyl per mol of V-PDMS. In yet other embodiments, the vinyl content of the V-PDMS is between approximately 0.01 and 0.1 equivalent/kg, or between approximately 0.036 and 0.07 eq/kg, or between approximately 0.04 and 0.05 eq/kg.

The base polymer may be a vinyl containing polydialkylsiloxane, polyalkylarylsiloxane, or polydiarylsiloxane including vinyl polymers and copolymers. For example, the vinyl-containing base polymer may contain any of the following monomers: dimethyl, diethyl, vinylmethyl, diphenyl, phenylmethyl, trifluoropropylmethyl, nonafluorohexamethyl, dimethoxy, and diethoxy. In addition to divinyl terminated base polymers, alpha-vinyl, omega-hydride terminated polymers may be employed as a substantial portion of the gel polymer.

The amount of base polymer in the silicone gel composition may be between 40-90 wt %, between 45-80 wt %, or between 50-65 wt %.

Crosslinker

The Si—H end groups for the reaction in (I) may be provided by a crosslinker and/or a chain extender. A crosslinker is capable of forming connections between vinyl-terminated polydimethylsiloxane chains. In certain embodiments, the crosslinker includes electronegative substituents such as alkylsiloxy or chlorine. In some embodiments, the crosslinker may have three or four or more Si—H groups that are capable of forming a connection point between three or four different vinyl-terminated polydimethylsiloxane chains, respectively. The crosslinker may have four Si—H groups. For example, the crosslinker may be tetrakis(dimethylsiloxy)silane, shown below in (IIIa), or 1,3-diphenyltetrakis(dimethylsiloxy) disiloxane. In other embodiments, the crosslinker may include three Si—H hydride groups, for example, the crosslinker may be methyltris(dimethylsiloxy) silane, shown below in (IIIb), or phenyltris(dimethylsiloxy) silane. Other crosslinkers may also be used. Using higher functional crosslinkers is also possible, but these form less defined polymer structures.

(IIIa)

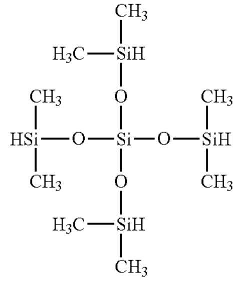

-continued (IIIb)

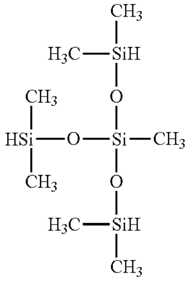

The preferred cross linkers may include Gelest SIT 7278 tetrakis dimethyl siloxy silane and Gelest SIP 6826, phenyl tris dimethyl siloxy silane, but other hydride based cross linkers may also be used. For example, crosslinker may include phenyltris(dimethylsiloxy)silane (e.g., CAS 18027-45-7) to improve tear resistance of the silicone gel.

An alternative multifunctional vinyl cross linker may be used to reduce the steepness of the hardness ratio curve. The advantage of the multifunctional vinyl cross linker is that it can be placed on both sides A and B since the multifunctional vinyl compound will not react with the hydride in the B side without any platinum catalyst. The ability to put some of the multifunctional vinyl compound on the B and/or A side enables the A to B ratio to remain close to 1.00 to 1.00 with varying hardness values, effectively flattening the curve of hardness versus ratio. The alternative cross linker consists of any multifunctional vinyl compound such as a bis(divinyl) terminated polydimethylsiloxane, for example, Gelest DMS-VD11.

Chain Extender

In addition to the crosslinker, the Si—H end group may be provided by a chain extender, for example, wherein both ends of the chain extender compound are terminated with a Si—H group. Any difunctional Si—H molecule with good solubility in the base vinyl may be suitable as a chain extender. For example, the chain extender may be a hydride terminated PDMS. Practically speaking, below a certain molecular weight, the dihydride may become too volatile. Chain extenders having about 400-500 g/mol, or about 450 g/mol, or greater, may be employed. Higher molecular weight dihydrides may be employed. For example, dihydrides of similar molecular weight up to the base polymer MW high end of range above may be employed, with some adjustment to account for the resulting differences in molecular weight between crosslinks. Chain extenders (dihydride functional molecules, F=2) may be employed when a low viscosity, low molecular weight base polymer is used, for one purpose in order to increase molecular weight between crosslinks. When higher molecular weight (e.g. >80 k G/mol) base polymers are used, chain extender may not be required.

In certain embodiments, the chain extender comprises reactive groups that are compatible and are willing to react with the vinyl groups in the base polymer. Just as for the crosslinker, these groups are Si—H groups that can react in a hydrosilation reaction. The chain extender typically includes two functional groups; however, the chain extender may include three or more functional groups, such that the chain extender functions as a branching agent. The functional groups may be the same as or different than each other. The functional groups may also be the same as or different than the functional groups of the first component and/or the second component.

The chain extender may be any chain extender known in the art. In one embodiment, the chain extender is a hydride containing polydimethylsiloxane. In another embodiment, the chain extender may be a hydride terminated polydimethylsiloxane, shown below in (IV).

(IV)

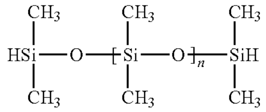

The chain extender may be a hydride terminated polyphenylmethylsiloxane. In another embodiment, the chain extender is a hydride terminated polydiphenylsiloxane. In yet another embodiment, the chain extender is a dihydride containing siloxane. For example, the chain extender may be a hydride terminated PDMS having avg. molecular weight of about 400 to about 62,700 g/mol; or about 400-500 g/mol, about 600-700 g/mol, about 1000-1100 g/mol; about 4000-5000 g/mol; about 17,200 g/mol; about 28,000 g/mol; or about 62,700 g/mol. The chain extender may have a high molecular weight or a low molecular weight. The chain extender may also be branched or unbranched. In other embodiments, the chain extender is a high molecular weight polydimethylsiloxane. In other embodiments, the chain extender is a low molecular weight polydimethylsiloxane of MW 400-500 g/mol.

Considering the full acceptable range of vinyl base polymer, the total dihydride content (based on the molecule referenced) could be as high as 15-20%—this would be for 100 cSt vinyl base polymer. For vinyl base polymers above ~40 k cSt, dihydride (chain extender) content could be very low-approaching 0%. In some embodiments, silicone gel compositions may use even 0% chain extender.

Optionally, an alkoxy-functionalized siloxane can be included. Suitable alkoxy-functionalized siloxanes include polydiethoxysiloxane, tetraethoxy silane, tetramethoxy silane, and polydimethoxysiloxane (DMS). In other embodiments, the chain extender may be a fluorosilicone, phenyl silicone, or a branching diethyl silicone.

In certain embodiments, by making use of the chain extender molecule, the V-PDMS base polymer can be shorter because the H-PDMS chain extender will extend the V-PDMS base polymer chain in situ between two crosslinker compounds. By using this mechanism, a V-PDMS chain of a shorter length can be applied which leads to lower viscosities and compounds that are easier to work with. Therefore, lower viscosity base polymer compounds can be used unlike a peroxide activated cure reaction mechanism. For example, a peroxide activated cure mechanism makes use of polymer chains with viscosities of approximately 2,000,000 cSt (2,000,000 $mm^2/s$) while in the platinum cure mechanism allows for base polymer chains (V-PDMS) having viscosities of approximately 5,000 cSt (5,000 mm2/s).

MFHC and H/V Ratios

The amounts of crosslinker and chain extender that provide the hydride component may be varied. In certain embodiments, the amount of hydride in the gel may be defined in terms of the mole fraction of hydride present as crosslinker ("MFHC"). For example, when the MFHC value is 0.3 or 30%, this means that 30% of the hydrides present in the system are part of the crosslinker and the remaining 70% of the hydrides are provided by the chain extender. In certain embodiments, the MFHC ratio may be altered to adjust the hardness of the gel (i.e., an increase in the MFHC may increase the hardness). In certain embodiments, the MFHC value may be greater than 0.2, 0.3, 0.4, or 0.5. In some embodiments, the MFHC value is between 0.2 and 0.5. In other embodiments, the MFHC value is between 0.3 and 0.4.

The overall amount of hydride components in the gel can also vary. The ratio of hydride to vinyl components (for example, provided by the base polymer) can be defined as "H/V." In other words, H/V is the total moles of hydride (for example, contributions from crosslinker and chain extender) divided by the amount in moles of vinyl from the base polymer (e.g., V-PDMS) present. In certain embodiments, the silicone gel may have a H/V ratio between 0.5 and 1.0, between 0.6 and 1.0, between 0.7 and 1.0, between 0.8 and 1.0, or between 0.9 and 1.0. If the H/V ratio is greater than 1, this means that there are more hydride groups present in the system than vinyl groups. In theory, the silicone gel will have a maximum hardness where the H/V ratio is 1 (this is the theoretical point where all the groups react with each other.) However, in practice this is not always the case and the maximum will be situated in the neighborhood of H/V equals 1.

Figure 3:
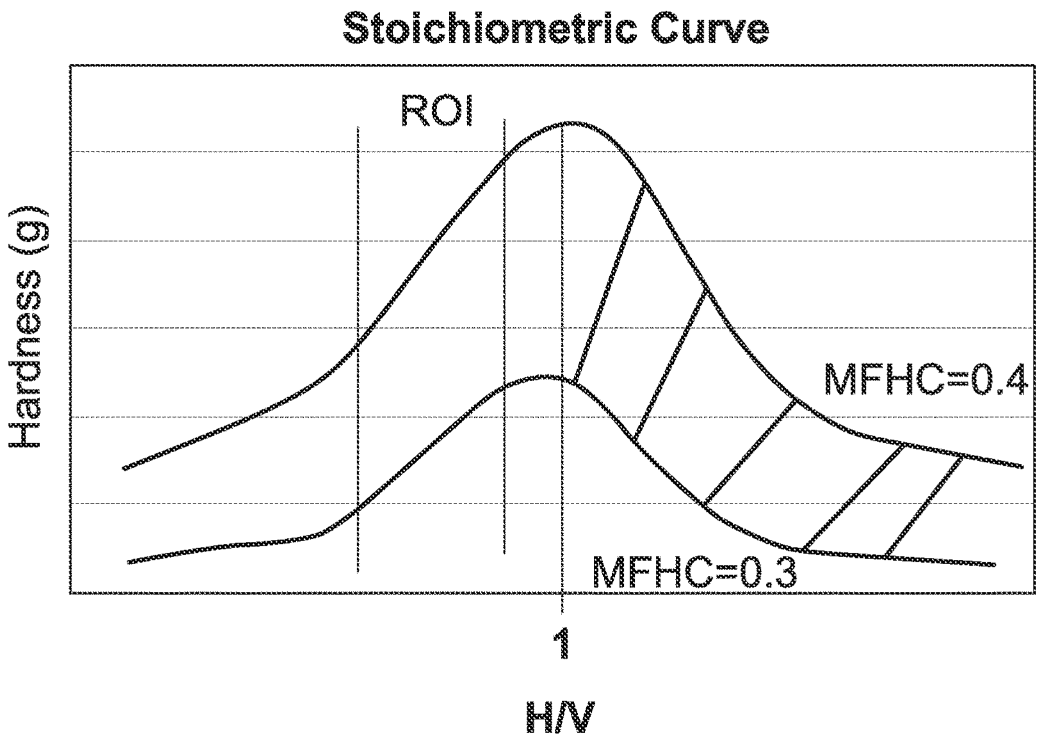
FIG. 3 shows a graph of a theoretical representation stoichiometric curve comparing hardness of a silicone gel as a function of the mole fraction of hydride content in the crosslinker (MFHC) and the hydride/vinyl ratio (HN).

The target hardness of the gel may tailored by adapting the formulation stoichiometry of components A (PDMS vinyl groups) and B (Hydride groups from the crosslinker and extender chains). A theoretical representation depicting the relation between hardness of the silicone gel and the H/V ratio is shown in FIG. 3. In certain embodiments, the region of interest (or "ROI") for the silicone gel comprises slightly less hydrides than vinyl groups (i.e., the H/V is less than but close to 1). This is because gels with H/V values greater than 1 can undergo undesired post-hardening of the gel. With the help of the stoichiometric curve shown in FIG. 3, the relationship between the amount of hydride groups and the amount of vinyl can be calculated to get a certain hardness. This value can be used to obtain the different amount of reagents needed to make a gel with the wanted hardness. With the addition of non-reactive silicone oil, the amount of crosslinker and/or chain extender may be increased somewhat from the calculated ratio of hydride to vinyl in order to achieve a target hardness.

A schematic overview of the reaction is depicted in (V) below, wherein the crosslinker compounds are represented by "+," the chain extender compounds are represented by "=," and the base polymer V-PDMS compounds are represented by "−." In certain embodiments, the chain extender must always connect two different base polymer compounds, or connect to one base polymer and terminate the chain on the opposite end. (V)

In certain embodiments, an addition cure catalyst is used to assist in reacting the base polymer, crosslinker, and chain extender. Performing the reaction without using a catalyst is typically a very energy consuming process. Temperatures of 300° C., or even higher may be needed in order to avoid the produced gel to have poor and inconsistent mechanical properties.

The catalyst may include a Group VIII metal. In other embodiments, the catalyst comprises platinum. Platinum catalyst can be prepared according to methods disclosed in the art, e.g., Lewis, Platinum Metals Rev., 1997, 41, (2), 66-75, and U.S. Pat. No. 6,030,919, herein incorporated by reference. In another embodiment, the catalyst is a homogenous catalyst. In other embodiments, the catalyst is a heterogeneous catalyst. Examples of heterogeneous catalysts include platinum coated onto carbon or alumina.

The catalyst may be a "Karstedt's catalyst." This is a platinum catalyst made of Pt complexed with divinyltetramethyldisiloxane, shown below in (VI).

(VI)

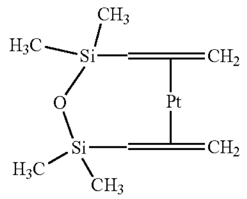

An advantage of this catalyst is the fact that no heterogeneous reaction is taking place but that the catalyst will form a colloid. An advantage of these catalysts is the fact that only a small amount (ppm level) is needed. This reduces the cost of the polymerization process.

The catalyst may be a rhodium chloride complex, e.g., tris(triphenylphosphine) rhodium chloride ("Wilkinson's catalyst"). Rhodium based catalysts may require higher concentrations and higher reaction temperatures to be successful to a large extent. But poisoning comes together with reactivity; and therefore rhodium based catalysts may be less easily poisoned than platinum catalysts.

The catalyst may be a carbonyl derivation of iron, cobalt, and nickel. For example, the catalyst may be dicobaltoctacarbonyl $CO_2(CO)_8$. High temperatures (e.g., >60° C.) should be avoided in order to prevent decomposition and deactivation of the catalyst. In comparison to the Pt catalyst, here $10^{-3}$M are needed in the case of Pt which is $10^{-6}$M or ppm level. Also the reactivity is slowed down by a factor of 5.

The catalytic reaction mechanism may be a Lewis-mechanism. First, there is a coordination of oxygen to the catalyst in the presence of the crosslinker or chain extender. This step is called the induction period. This gives hydrogen and the platinum colloid. Next, the chain extender or crosslinker will precede the attack of the vinyl group. By doing this, an electrophile complex is formed. The vinyl group (V-PDMS) then will act as a nucleophile. Combining both the vinyl-group of the V-PDMS chain with the crosslinker or chain extender that was bound to the Pt-catalyst gives the silicone product. The hydride is transferred to the second carbon of the vinyl group. The Pt-colloid is than available for reacting a second time. Oxygen can be seen as a co-catalyst because oxygen is not consumed in this reaction and the O—O is not broken in the reaction sequence.

Catalysts should be isolated from compounds that can poison, or otherwise harm, the catalyst's performance. For example, amines, thiols, and phosphates can all poison a catalyst such as a platinum containing catalyst. Amines, thiols, and phosphates may form very stable complexes with a catalyst, thereby slowing the reaction or altogether stopping the reaction.

Inhibitor

In certain embodiments, inhibitors are added in the silicone gel formulation to slow down the curing process. Slowing down the curing process allows more time to work with the polymer mixture during processing, dispensing, and molding.

The inhibitor can bind to the catalyst and form a stable complex. By doing this, the Pt catalyst is deactivated. When the complex is activated by adding energy (raising the temperature) the inhibitor will lose its binding for the Pt-catalyst. After this, the Pt-catalyst is in its activated form again and the polymerization reaction can start. The inhibitor may help manipulate the gel before it fully cures and extend the pot life. In certain embodiments, the pot life may be approximately 1 hour at room temperature and 6-8 hours at 3° C.

In certain embodiments, the inhibitor comprises two electron-rich groups (alcohol- and allylfunction) forming an acetylenic alcohol. These groups can interact with the catalyst and shield it from other reactive groups. The inhibitor of a Pt-catalyst may be 3,5-Dimethyl-1-hexyn-3-ol, shown below in (VII).

(VII)

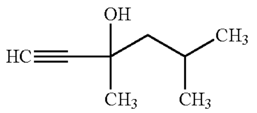

The silicone gel composition may comprise additional common components. For example, the compositions may include additives such as flame retardants, coloring agents, adhesion promoters, stabilizers, fillers, dispersants, flow improvers, plasticizers, slip agents, toughening agents, and combinations thereof. In certain embodiments, the additional additives may include at least one material selected from the group consisting of ethyl polysilicate (Dynasylan 40), diphenyl siloxaone-dimethylsiloxane copolymer (PDM 1922), 1,2-bis(3,5-di-tert-butyl-4-hydroxyhydrocinnamoly) hydrazine (Songnox 1024), Kingnox 76, DHT-4A, Kingsorb, pigment, and mixtures thereof. In some embodiments, the additives comprise between 0.1 and 25 wt % of the overall composition, between 0.1 and 5 wt % of the overall composition, between 0.1 and 2 wt % of the overall composition, or between 0.1 and 1 wt % of the overall composition.

In order to improve tear strength and silicone gels may be optionally toughened by incorporating a silica ($SiO_2$) reinforcement into the structure. The silica reinforcement may be a fumed silica, precipitated silica, or a structurally-modified silica reinforcement. A silica reinforcement may be employed in the silicone gel in a range of from 0-30 wt %, 1-25 wt %, or 5-20 wt %. For example, hydrophobic fumed silica may be employed for improvement of physical properties. Hydrophilic fumed silica may be employed for modifying the viscosity of the components to produce shear thinning behavior. Typical amount of a fumed silica may be about 0-30 wt %, 10-25 wt %, or 2-20 wt % %. For example, a structurally- modified silica (e.g., silane-modified fumed silica, e.g., Aerosil R 8200) may be employed to improve tear strength, for example, in a range of 0-30 wt %, 5-25 wt %, or 10 -20 wt %

In some embodiments, the compositions disclosed and by methods disclosed herein comprise a flame retardant. In certain embodiments, the flame retardant is zinc oxide. In some embodiments, the flame retardant comprises between 0.1 and 25 wt % of the overall composition, between 0.1 and 5 wt % of the overall composition, between 0.1 and 2 wt % of the overall composition, or between 0.1 and 1 wt % of the overall composition. In one embodiment, the flame retardant comprises 20 wt % of the overall gel composition.

Non-Reactive Silicone Oil

The silicone gel composition may contain a non-reactive silicone oil fluid in the first and or second set of components. The non-reactive silicone oil may be an inert polydimethylsiloxane (PDMS). For example, the non-reactive silicone oil may be a trimethylsiloxy terminated PDMS, or a silanol terminated PDMS (Si—OH). Other inert silicone fluids may include diphenyl siloxane-dimethylsiloxane copolymers, phenylmethylsiloxane-dimethylsiloxane copolymers, phenylmethylsiloxane homopolymers, phenylmethylsiloxane-diphenylsiloxane copolymers, alkyl silicones, aryl-alkylsilicones and fluorosilicone fluids. In some embodiments, the non-reactive silicone oil is a trimethylsiloxy terminated PDMS, for example as shown in (VIII). The non-reactive silicone oil may have kinematic viscosity in a range of from 10 cSt to 30,000 cSt, 20-5,000 cSt, 50-1,000 cSt, or 50-350 cSt at 25° C. The non-reactive silicone oil may be a trimethylsiloxy terminated PDMS having a kinematic viscosity of about 50, about 100, about 200, or about 350 cSt at 25° C.

(VIII)

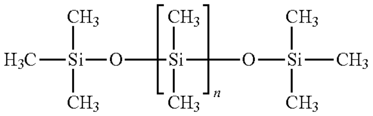

The silicone gels of the disclosure may be prepared by incorporating 10-60%, 20-55%, or 30-50%, 35-45%, or about 40% by volume of a non-reactive silicone oil fluid. The non-reactive silicone oil fluid levels may differentiate the silicone gels of the present disclosure from certain prior art which contain approximately 65% or more by volume fluid and were much lower in hardness and not nearly as strong.

In some embodiments, the compositions disclosed and made by methods disclosed herein contain at least one stabilizer. Stabilizers include antioxidants, acid-scavengers, light and UV absorbers/stabilizers, heat stabilizers, metal deactivators, free radical scavengers, carbon black, and antifungal agents.

Making the Silicone Gel

The silicone gel may be prepared by mixing a first set of components together, mixing a second set of components together, and then mixing the two sets of components together. A non-reactive silicone oil fluid is added to at least one of first and/or second set of components (A and/or B sides). The first set of components may comprise blending the base polymer (e.g., V-PDMS) with the catalyst and a silicone oil. The second set of components may comprise blending the crosslinker and chain extender. The second set of components may also comprise blending additional base polymer, optionally a non-reactive silicone oil, and in some embodiments, an inhibitor. In some embodiments, the first and/or second set of components may also comprise blending at least one of the additives discussed above.

The first set of components may include the base polymer, a catalyst, and optionally the non-reactive silicone oil. The amount of catalyst present in the first set of components may be between 0.01-1 wt %, between 0.03-0.1 wt %, or approximately 0.06 wt %. The amount of base polymer in the first set of components may be between 40-99 wt %, between 40-90 wt %, between 45-80 wt %, or between 50-65 wt %. When present in the first set of components, the amount of a non-reactive silicone oil may be between 10-60 wt %, 20-55 wt %, or 30-50 wt %.

Regarding the second set of components, the starting amount of crosslinker may be between 0-20 wt %; between 0.001-10 wt %; 0.005-5 wt %; between 0.01-1 wt %, between 0.02-0.5 wt %; between 0.05-0.3 wt %; or between 0.075-0.125 wt %. The amount of chain extender in the second set of components may be between 0-15 wt %; between 0.1-10 wt %; between 0.5-5 wt %; between 1-3 wt %; or between 1.5-2.5 wt %. The amount of optional inhibitor in the second set of components may be between 0-1.5 wt %; between 0.01-1 wt %, or between 0.03-0.5 wt %. The amount of base polymer in the second set of components may be between 40-99 wt %, between 40-90 wt %, between 45-80 wt %, or between 50-65 wt %. When present in the second set of components, the amount of a non-reactive silicone oil may be between 10-60 wt %, 20-55 wt %, or 30-50 wt %.

The amount of combined crosslinker and chain extender in the overall silicone gel composition may be between 0.01-20 wt %, between 0.05-15 wt %, between 0.08-10 wt %, between 0.1-5 wt %, between 0.5-3 wt %, or approximately 1.25 wt %. The amount of base polymer in the overall silicone gel composition may be between 40-90 wt %, between 45-80 wt %, or between 50-65 wt %. The amount of non-reactive silicone oil in the overall silicone gel composition may be between 10-60 wt %, 20-55 wt %, or 30-50 wt %.

Non-reactive silicone oil can be added to first set of components and second set of components in equal portion, both sides in unequal portion, or only to one side. In one embodiment, oil is added to both sides in equal portion.

The hardener, or curing agent, is a multi-hydride functional molecule or blend of multi-hydride functional molecules, either of which may or may or not contain an inhibitor (this is solely a concern for processing). Multi-hydride molecules (having Si—H functionalities F>2) are used to effect crosslinking and to generate elasticity & hardness. Generally multi-hydride crosslinkers are employed with F<10, most-preferably F=4 or 3. The amount of hardener required varies based on vinyl content, oil content and other factors. Chain-extenders (dihydride functional molecules, F=2) are employed when a low viscosity, low molecular weight base polymer is used, where the purpose is to increase molecular weight between crosslinks. When higher molecular weight (e.g. >80 k G/mol) base polymers are used, a chain extender may not be strictly required. Inhibitor may be used when a longer working time is needed for processing the A+B mixture.

The silicone gel may be prepared by mixing the first set of components with the second set of components. In one embodiment, the weight ratio of the blend of the first set of components to the second set of components is approximately 1:1. In another embodiment, the weight ratio of the blend is between approximately 47.5:52.5 and 52.5:47.5. Adjusting the ratio slightly can cause large differences in the overall hardness of the silicone gel. For example, in certain embodiments, when the ratio is 52.5:47.5 between the first and second set of components (wherein the second set of components comprises V-PDMS, crosslinker, chain extender, and inhibitor), the hardness may be lower than the hardness of the same composition at the 1:1 blending ratio. Additionally, in certain embodiments, when the ratio is 47.5:52.5 between the first and second set of components, the hardness may be greater than hardness of the same composition at the 1:1 blending ratio. In one example, the hardness may be approximately 72 g at the 52.5:47.5 ratio, 140 g at the 1:1 ratio, and about 210 g at the 47.5:52.5 ratio. In other words, a 2.5% variation may affect the hardness of the gel by as much as 70 g. Therefore, the weighing procedure during the preparation of the gel composition is preferably carried out with a high precision.

Uses and Properties of the Silicone Gel

The silicone gels described herein may be used in a number of end uses due to their improved properties, such as improved behavior in mechanical stresses (e.g., vibration and shock) or ability to seal uneven or complicated structures (due to the ability to flow and adapt to the area of the structure), and reduced compression set recovery times (the ability to rapidly seal upon closure). In certain embodiments, the silicone gels may be used in an interconnect, cover, or closure system. In particular, the silicone gel may be used in a fiber optic closure, electrical sealant, or electrical closure. In some embodiments, the silicone gels are used as gel wraps, clamshells, or gel caps. In further embodiments, the silicone gels are used in the inside of a residence. In other embodiments, the silicone gels may be used outside of a residence. Use of the silicone gel within a closure or interconnect system may allow for a reduction in the number of components, frame size, or cost over other sealing mechanisms.

The silicone gel may be used as a flame retardant sealant. In one embodiment, the silicone gel comprises a flame retardant additive (e.g., zinc oxide) in order to function as a flame retardant sealant.

The silicone gel may be used in a closure system. In certain embodiments, the closure system comprises a housing, a cable, and a silicone gel. In some embodiments, the cable may be a low smoke zero halogen LSZH cable.

Example sealant materials can be defined by properties such as hardness, compression set, resistance to extrusion, elongation to failure, and oil bleed out properties. Example value ranges for each property and testing procedures for measuring these values for sample materials are described below.

Indentation Hardness

The sealant material can be tested for indentation hardness using a texture analyzer including a load cell and a probe assembly. The load cell may be motor drive. The load cell may be bi-directional. The probe assembly includes a stainless-steel ball probe. The ball probe has a size of about 6.35 mm (0.25 in). The load cell has a minimum resolution of 0.20 g and ±0.5% FSR accuracy. The load cell has a trigger point of about 4 g (grams force). One example texture analyzer suitable for the hardness test is the Brookfield CT3 Model 1500 offered by Brookfield Engineering Laboratories, Inc. of Middleboro, Mass.

During the test, the material to be tested is placed in a cup beneath the probe assembly. The cup is formed from aluminum. The cup is filled with 51 grams of the material to be tested. The material filling the cup is bubble free. The cup has a frusto-conical inner shape having a major inner diameter of 50 millimeters at an open top end, a minor inner diameter of 45 millimeters at a closed bottom end, and a depth of 30 millimeters extending between the top and bottom ends.

The load cell drives the probe assembly vertically into a sample of material at a speed of 2 mm/sec to a depth of 4 mm. The load cell holds the probe assembly at the 4 mm depth for 1 hour.

The indentation hardness is measured (in grams) as a peak force and a residual force applied by the load cell to the probe assembly. The peak hardness is measured instantly when the probe assembly is at the pre-set depth from the trigger point. The residual hardness is measured at the pre-set depth after passage of the pre-set period of time. For example, the residual hardness may be measured after 1 hour (3600 seconds). In certain examples, an average and standard deviation are calculated for the peak force and residual force measurements. In one example, a sealing materials suitable for use in the gel sealing applications described herein have a residual indentation hardness ranging from 20 g (grams force) to 150 g or 50 g to 130 g after 1 hour.

Compression Set

The sealant material can be tested for compression set under constant deflection in air. In certain examples, the material is tested using ASTM D395, Method B.

The material to be tested is formed into a cylindrical sample. The cylindrical sample has a diameter of about 20 mm and a height of about 20 mm.

The test is conducted using an oven (e.g., air-circulating) and a compression fixture. The compression fixture includes compression plates, spacers, and components to compress the plates. The compression plates are arranged in a vertical orientation so that the compression fixture has top and bottom compression plates. The compression plates and spacers are formed from steel. The plates have the dimensions 150 mm length×150 mm width×12.5 mm height. The spacers have the dimensions 25 mm width×10 mm height. The spacers each have an 8 mm center hole. The components to compress the plates include bolts and nuts. The bolts are 10 mm long.

During the test, the sample (e.g., the cylindrical sample) is placed on the compression fixture between the top and bottom compression plates so that the height of the sample extends along an axis between the top and bottom plates. The nuts and bolts are tightened to move the compression plates together to compress the sample. The spacers are positioned between the compression plates to limit the compression of the sample. In certain examples, the compression plates are moved relatively towards each other (e.g., the top plate is moved towards the bottom plate, the bottom plate is moved towards the top plate, or both plates are moved towards each other) until the compression plates are separated by a height of the spacers. For example, the sample may be compressed to a height of about 10 mm using 10 mm tall steel spacers.

The compressed sample is placed in the oven at a pre-set temperature for a pre-set period of time. In certain examples, the compression fixture and the sample are placed in the oven. The compression fixture holds the sample in the compressed state while in the oven. The compressed sample remains in the oven for a preset period of time, such as 22 hours while the oven maintains an internal temperature of 70° C. The pre-set period of time for compression of the sample may be, for example, 22 h, 7 days, 14 days, 21 days, or 56 days.

The heated sample and compression fixture are removed from the oven after the pre-set period of time. The compression fixture may be allowed to cool to room temperature before opening. The top compression plate is removed from the sample to allow the sample to recover. For example, the nuts and bolts may be loosened and/or removed so that the top compression plate can be removed from the sample.

The height of the sample may be measured after a pre-set period of recovery time, for example, 5 min, 20 min, 30 min, 60 min, 3 hr, 24 hrs, 48 hrs, or 100 hours of recovery time. The percent compression set is calculated by the following equation:

$$\text{Compression set} = \frac{(OH - PH)}{(OH - SH)} \times 100 \quad (1)$$

where OH is the original sample height, PH is the sample height after testing and recovering, and SH is the spacer height.

In one example, a sealing material is provided that is suitable for use in the gel sealing applications described herein. In some embodiments, the sealing materials have a compression set of less than 10% after 20 minutes of recovery time, or less than 10% after 10 minutes of recovery time, or less than 5% after 60 minutes of recovery time, or less than 5% after 30 minutes of recovery time.

In some embodiments, a sealing material is provided that exhibits a compression set in the range of 0-20%, 2-20%, 2-10%, or no more than 12%, no more than 10%, no more than 5%, or no more than 4% after 24 hrs of recovery time.

In some embodiments, a sealing material is provided that exhibits a compression set in the range of 0-20%, 2-20%, 2-10%, or no more than 12%, no more than 10%, no more than 5%, or no more than 4% after 24 hrs of recovery time for a sample after 22 hrs, 7 days, 14 days, 21 days, or 56 days of sample compression time.

In some embodiments, a sealing material is provided that exhibits a compression set in the range of 0-10%, 0-5%, 0-4%, or no more than 5%, or no more than 4% after 24 hrs of recovery time for a sample after 22 hrs of sample compression time.

In some embodiments, a sealing material is provided that exhibits a compression set in a range of 0-10%, 0-5%, 0-4%, or no more than 5%, or no more than 4% after 24 hrs of recovery time for a sample after 7 days of sample compression time.

Resistance to Extrusion

Figure 4:
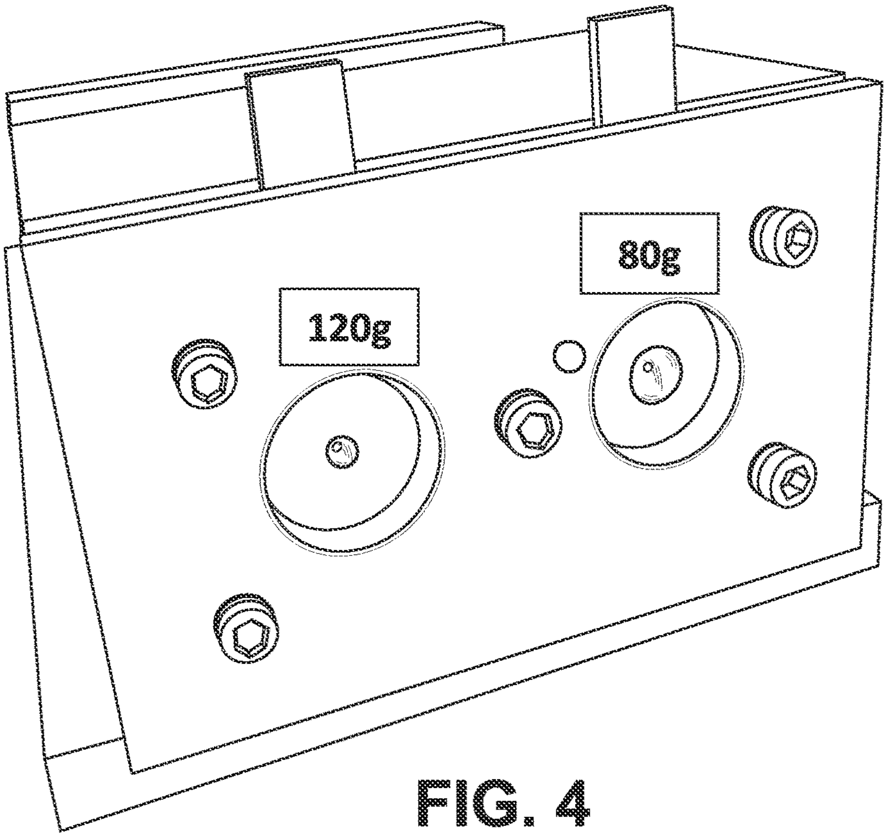
FIG. 4 shows a photograph of an extrusion resistance test device wherein extended silicone gels with 40% of a 50 cSt silicone oil of target hardness 80 g or 120 g, when under 25 psi pressure at 70° C. for 1 week (168 hours) exhibited gel bubbles of ʃ7 mm diameter (protruding ~5-6 mm from device) or ~4 mm diameter (protruding ~2-3 mm from device), respectively.

The sealant material can be tested for resistance to extrusion using an extrusion fixture, a pneumatic cylinder, and an oven (e.g., an air-circulating oven). The extrusion fixture includes a body defining an interior test chamber and an extrusion plate that selectively covers a first end of the test chamber. The test chamber is cylindrical in shape and as a diameter of 25 millimeters. The extrusion plate closing one end of the test chamber defines a 4 mm circular opening in its center in fluid communication with the test chamber. An exemplary test chamber is shown in FIG. 4.

The material to be tested is formed into a cylindrical sample having a diameter of 25 mm and a height of 25 mm.

During the test, the sample is placed inside the cylindrical test chamber and the extrusion plate is placed over the first end of the test chamber. An aluminum cup is placed outside the extrusion fixture beneath the circular opening.

A compression plate is placed behind the sample at an opposite second end of the test chamber. The compression plate is round with a diameter of 25 mm. The compression plate is low friction and formed of plastic. A pneumatic cylinder is operationally coupled to the compression plate to move the compression plate relative to the extrusion fixture. In particular, compression rods of the pneumatic cylinder contact the plastic compression plate.

The pneumatic cylinder is energized and pressurized such that the pneumatic cylinder applies 200 kPa of pressure to the sample. The pressurized sample and pneumatic cylinder are placed in the oven at 70° C. Materials that are not extrusion resistant will fall into the aluminum cups. Materials that are extrusion resistant will bulge out of the opening in a bulbous extrusion. If no part of the sample falls into the aluminum cup, then the pressure is removed from the sample after a period of time, e.g., after 24 hours or 168 hrs. The sample is allowed to recover with no pressure applied and allowed to return to room temperature. Once the sample returns to room temperature, the volume (if any) that remains extruded in a bulge outside the extrusion plate is measured. In certain examples, suitable materials will have a measured volume of no more than 0.5 $cm^3$, or no more than 0.25 $cm^3$ or 0 $cm^3$.

Elongation to Failure

The sealant material can be tested for tensile elongation using ASTM D638. For example, the material can be tested using a Universal Test Machine (UTM), such as a Universal Testing System offered by Instron of Norwood, MA. The UTM includes a 2 kg load cell and two cylindrical rods. Each cylindrical rod has a 6 mm diameter and is formed of steel. The rods are each horizontally oriented with a lower rod attached to a stationary base of the UTM and an upper rod attached to the load cell. Accordingly, the lower rod remains stationary relative to the base while the upper rod is movable relative to the lower rod using the load cell.

The material to be tested is cut into rings having an outer diameter of 30 mm and an inner diameter of 20 mm. The rings have a thickness of 3-4 mm.

During the test, the rings are positioned so that the upper and lower rods extend into the rings. The load cell is moved at a rate of 50 mm/min. Accordingly, the upper rod moves away from the lower rod at that rate. As the upper rod is moved, the UTM measures a force applied to the upper rod versus the extension curve of the ring. From these measurements, the elongation to failure is calculated. The elongation to failure is calculated based on the initial length (approximately 31.5 mm) of the ring. In certain examples, suitable materials will have an elongation to failure of at least 500% or 800% of the initial length of the sample.

Oil Bleed Out

The sealant material can be tested for oil bleed out to determine the oil loss of the material under pressure. The material to be tested is formed into multiple cylindrical samples each having a diameter of 14 mm and a thickness of 3-4 mm.

The test is performed using a test block, three coarse screens (0.16 $mm^2$ mesh), three fine screens (0.01 $mm^2$ mesh), three pistons, three weights, an analytical balance, and an oven. The test block defines three testing cavities having open upper ends. Each testing cavity is sized to receive one of the cylindrical samples through the open upper end. The weights are shaped to fit partially into respective testing cavities through the open upper ends.

During the test, the initial weight of each sample is measured. Each sample is placed on a respective fine screen. Then, each sample and corresponding fine screen is placed on a respective coarse screen. The screens support the samples while allowing low molecular weight material to separate. Each sample and corresponding screens is placed within one of the cavities defined in the test block.

A respective piston is placed over each sample within the respective testing cavity. A respective weight is placed over each piston to apply 120 kPa of pressure to the respective sample. The weight is shaped so that a portion of the weight extends downwardly into the testing cavity through the open upper end. The test block, screens, samples, pistons, and weights form a testing assembly. The testing assembly is placed in an air circulating oven at a temperature of 70° Celsius.

At regular intervals, the testing assembly is removed from the oven and the samples are removed from the testing block. The samples are blotted on cleaning paper and weighed on an analytical balance. After weighing, the samples are replaced within the respective testing cavities and the weights are replaced over the samples. The testing assembly is returned to the oven. These regular intervals are repeated until at least 500 hours have elapsed or the sample weights have stabilized. In certain examples, the sample weight of suitable materials measured at 500 hours will be greater than or equal to 80% of the initial weight (e.g., less than 20% oil bleed out), or greater than or equal to 85% of the initial weight (e.g., less than 15% oil bleed out), or greater than or equal to 90% of the initial weight (e.g., less than 10% oil bleed out).

In some embodiments, the silicone gel may be used in a closure or interconnect system that is "compatible" with cable, for example, a low smoke zero halogen (LSZH) cable. In certain embodiments, compatibility is measured by subjecting the sample to one or more mechanical or environmental tests to test for certain functional requirements. In some embodiments, compatibility is measured by passing a pressure loss test, tightness test, and/or visual appearance test. In certain embodiments, the silicone gel in the closure or interconnect system is compatible.

Tightness may be tested under International Electrotechnical Commission (IEC) Test 61300-2-38, Method A and IEC 60068-2-17, Test Qc. In certain embodiments, tightness is tested by immersing the specimen in a water bath and using an internal pressure of 20-40 kPa (0.2-0.4 atm) for 15 minutes. It is important that tightness is measured directly after installing the closure at a temperature of −15° C. or 45° C. It is also important that all the air bubbles present on the outside of the closure are removed. If a continuous stream of air bubbles is observed, this means the specimen is not properly sealed and it will be considered as a failure (i.e., not compatible).

Pressure loss may be tested under IEC 61300-2-38, Method B. In certain embodiments, the gel and cable are compatible if the difference in pressure before and after the test is less than 2 kPa (0.02 atm).

Visual appearance may be tested under IEC 61330-3-1 by examination of the product with the naked eye for defects that could adversely affect the product performance.

The sample may be subjected to various mechanical and/or environmental conditions prior to testing tightness, pressure loss, visual appearance, etc. In certain embodiments, compatibility is determined by subjecting the sample to one or more of the following mechanical tests: axial tension test, flexure test, re-entry test, and torsion test, and/or one or more environmental tests: resistance to aggressive media test, resistance to stress cracking test, salt fog test, temperature cycling test, and waterhead test.

The sample may be subjected to an axial tension test according to IEC 61300-2-4. In this test, the sample may be pressured internally at 20 kPa (0.2 atm) or 40 kPa (0.4 atm) at room temperature and sealed. The base assembly is clamped and a force is applied to each of the extending cables individually. If the sample has an outer diameter of less than or equal to 7 mm, then the amount of force per cable applied is equal to (outer diameter/45 mm)*500 Newtons ("N"). This force is applied for 15 minutes for each cable and built up to the IEC 61300-2-4 test. If the sample has an outer diameter of greater than 7 mm, then the amount of force per cable applied is equal to (outer diameter/45 mm)*1000 N, with a maximum of 1000 N applied. This force is applied for one hour. Internal pressure is then examined for pressure loss. In certain embodiments, the gel and cable are compatible if the pressure loss is less than 2 kPa (0.02 atm). In addition, in certain embodiments, the gel and cable are compatible if the displacement of the cable is less than 3 mm. In other embodiments, the specimens are further subjected to the tightness test, previously described.

The compatibility of the sample may be measured by subjecting the sample to a flexure test according to IEC 61300-2-37. In this test, the samples are subjected to temperatures of -15° C. and 45° C. Samples are pressured internally at 20 kPa or 40 kPa (0.2 atm or 0.4 atm) and sealed. Cables are bent individually at an angle of 30 degree (or a maximum force application of 500 N) each side of neutral in the same plane. Each bending operation is held for 5 minutes. The cable is returned to its original position and then the procedure is repeated in the opposite direction. After 5 cycles on each cable, the samples are visually inspected by the naked eye for appearance, conditioned at room temperature, and subjected to a tightness test. In some embodiments, the gel and LSZH cable are compatible if the specimen passes the visual appearance test, pressure loss test (i.e., less than 2 kPa (0.02 atm)), and/or tightness test.

The compatibility of the sample may be measured by subjecting the sample to a re-entry test according to IEC 61300-2-33. In certain embodiments, re-entry can be simulated after a certain time of temperature cycling. To complete this test, the closure has to be removed from the cycling room and tested on tightness. After this a reentry test can be done. In this test, a dummy plug or cable is removed from the closure and another cable or dummy plug is added. Then, tightness is measured again. Re-entry is successful if the closure passes the tightness test again.

Another mechanical test may be employed to determine compatibility. The sample may be subjected to a torsion test according to IEC 61300-2-5. After completion of the torsion test, the gel and cable may be considered compatible if the sample passes the visual inspection test, pressure loss test, and/or tightness test.

In yet other embodiments, compatibility is measured by conducting an environmental test of temperature cycling or accelerated aging under IEC 61300-2-22 and IEC 60068-2-14, Test Nb. In one embodiment, the temperature cycling test is conducted on the cable jacket between the gel blocks by cycling the temperature between −40° C. and 70° C. for 10 days at two cycles between the extreme temperatures per day. In some embodiments, the humidity is uncontrolled, the dwell time is four hours and the transition time is two hours. In certain embodiments, the cable jacket is tested for maintenance of tensile strength, ultimate elongation, tightness, visual appearance, and/or re-entry. Also, in certain embodiments, after the temperature cycling test, tightness of the closures needs to be tested after being conditioned to room temperature for a minimum of 2 hours. Therefore, in certain embodiments, the gel and cable, e.g., LSZH cable are compatible if the specimen passes the tightness test.

In another embodiment, compatibility is determined by subjecting the sample to a resistance to aggressive media test under EEC 61300-2-34, ISO 1998/I, and EN 590. The sample is considered compatible if it subsequently passes the tightness and/or appearance test.

In yet another embodiment, compatibility is determined by subjecting the sample to a resistance to stress cracking test under IEC 61300-2-34. The sample is considered compatible if it subsequently passes the tightness test and/or shows no visible signs of cracking.

In other embodiments, compatibility is determined by subjecting the sample to a salt fog test under IEC 61300-2-36 and IEC 60068-2-11, Test Ka. The sample is considered compatible if it subsequently passes the tightness and/or appearance test.

In some embodiments, compatibility is determined by subjecting the sample to a waterhead test under IEC 61300-2-23, Method 2. The sample is considered compatible if there is no water ingress.

One challenge in formulating a gel that behaves as described lies in crosslinking the gel such that it has good mechanical properties (strength and relatively high elongation) but is not too hard to close the opening around the round cross section of the cable without excessive force required to shut the closure. This gel property is characterized by the hardness. For example, in some embodiments, the silicone gel may exhibit a hardness as described herein above, or in the range of 26 to 53 Shore OOO Hardness, or 100 to 300 g, as measured according to methods known in the art. In other embodiments, the silicone gel has a hardness in the range of 26 to 42 Shore OOO, or 100 to 200 g. In other embodiments, the silicone gel has hardness in the range of 26 to 37 Shore OOO, or 100 to 160 g. In certain embodiments, the Shore hardness gauge is measured according to ISO868 or ASTM D2240.

The hardness can also be measured on a texture analyzer, as described above. For example, a LFRA Texture Analyzer-Brookfield may include a probe assembly fixed to a motor driven, bi-directional load cell. In such a system, the probe is driven vertically into the sample at a pre-set speed and to a pre-set depth. The hardness is the amount of force needed to push the probe into the test sample. For the silicone gel of the disclosure, the characteristic hardness of interest may be the force measured 60 seconds after the 6.35mm spherical probe is pushed into the gel to a depth of 4.0 mm. The $H_{60s}$, 60 second hardness value, should not exceed 350 g. The preferred $H_{60s}$ hardness range is less than 200 g and most preferred is less than about 120 g. Similarly, to obtain acceptable mechanical properties and the ability of the closure to be opened and resealed, a minimum 60 s hardness of about 40 g is required. The silicone gels of the disclosure exhibit $H_{60s}$ hardness in the range of 40 to 350 g, 45 to 300 g, 50 to 200 g, 60 to 150 g, 70 to 130 g, 80 g to 120 g, or 105 to 115 g.

In some embodiments, the gel is compressed with a certain strain or deformation (e.g., in certain embodiments, to 50% of its original size). This causes a certain stress in the material. The stress is now reduced because the material relaxes. In certain embodiments, the stress relaxation of the silicone gel has a possible range between 30 and 60% when subjected to a tensile strain or deformation of about 50% of the gel's original size, wherein the stress relaxation is measured after a one minute hold time at 50% strain. In other embodiments, the stress relaxation of the silicone gel is between 40% and 60% when subjected to a tensile strain of about 50%. A higher stress relaxation indicates that once a gel is installed in a closure, the gel will require less stress in order for it to seal.

For further example, in some embodiments, the compression set, as measured after 50% strain is applied for 1000 hours at 70° C., may have a range between 2% and 20%. In other embodiments, the compression set, as measured after 50% strain is applied for 1000 hours at 70° C., may have a range between 2% and 10% after 30 min recovery time when measured according to a modified version of ASTM D395, method B.

The compression recovery test is a measure of how rapidly the gel responds after being exposed to an external stress or change in shape. The recovery of compression set may be determined as described herein above for samples originally compressed to 50% at 70° C. for 22 hours, followed by cooling and removal of the compression, for example, as shown in FIG. 1.

Prior art silicone dry gels of U.S. Pat. Nos. 8,642,891 and 9,556,336, Berghmans et al., exhibit slow compression set recovery of about 60% compression set at 5 minutes, and about 30% compression set at 30 min. In contrast, FIG. 1 shows a graph of Compression Set versus recovery time for three representative silicone gels of the disclosure, having three different hardness values of 80 g (A), 100 g (B), or 120 g (C). Each of the three gels exhibits rapid recovery of compression set to no more than 10% within 5 minutes, and no more than 5% within 30 minutes.

Silicone dry gel compositions are provided comprising a vinyl-containing base polymer, a crosslinker, a chain extender, and a non-reactive silicone oil. For example, silicone gels of the disclosure may be made from a composition comprising a divinyl terminated polydimethylsiloxane as a base polymer, chain extender, cross linker and 10-60 wt % of a non-reactive PDMS silicone fluid. The non-reactive silicone oil may be a polydimethylsiloxane (PDMS), trimethylsiloxy terminated silicone oil fluid. The addition of non-reactive silicone fluid plus added chain extender and cross linker significantly decreased the compression set recovery rate of the original silicone dry gel while maintaining the same gel hardness as disclosed in U.S. Pat. Nos. 8,642,891 and 9,556,336, Berghmans et al. The prior art silicone dry gel samples tested under similar conditions required several hours to return to less than 10% compression set, whereas the silicone gel prepared from compositions of the disclosure typically exhibited less than 10% compression set within approximately 30 min, 20 min, 10 min, or even 5 minutes for the improved formulation.

In some embodiments, the silicone gel formed from a composition of the disclosure may exhibit no more than 15%, or no more than 10% oil bleed out over a period of time when the gel is under compression of 120 kPa (1.2 atm) at 70° C. In certain embodiments, oil bleed out is measured on a wire mesh, wherein the oil loss may exit the gel through the mesh. The weight of the gel sample is recorded before and after the pressure has been applied. In some embodiments, the silicone gels may exhibit no more than 15 wt % oil bleed out for up to 21 days, or no more than 20 wt % oil bleed out for up to 35 days.

The silicone gels of the disclosure may be made from formulations comprising a divinyl terminated polydimethyl siloxane as a base polymer, a chain extender, a cross linker, and a non-reactive PDMS silicone fluid.

For the high viscosity vinyl-based formulations (60,000 cP and greater) chain extender may or may not be used. A variety of crosslinking methods are possible.

EXAMPLES

Example 1. Silicone Gels with Non-Reactive Silicone Oil-PDMS Fluid

A silicone gel was prepared according to the disclosure as a two part A and B composition as shown in Table 1 below. Non-reactive silicone oil polydimethylsiloxane (PDMS), trimethylsiloxy terminated, (e.g., 350 cSt viscosity, avg MW 13650 g/mol) was added to both A and B sides. A and B sides were combined, molded and cured to form silicone oil gel blocks.

TABLE 1

Silicone gel A-side, B-side and Total Compositions

| Component | Description | wt | wt % A | Total A + B wt % | Supplier | Spec |
|---|---|---|---|---|---|---|
| V-PDMS | Vinyl terminated polydimethyl siloxane | 148.71 | 59.484 | 58.9960 | DMS V-35, Gelest Inc. | 5000 cSt |
| Platinum Catalyst | Platinum divinytetramethyldisiloxane complex | 0.15 | 0.060 | 0.0300 | SIP 6830.3, Gelest Inc. | 3-3.5% Pt |
| PDM 1922 | Diphenylsiloxane-dimethylsiloxane copolymer | 1.00 | 0.400 | 0.2000 | PDM 1922, Gelest Inc. | 160-230 cSt |
| Antioxidant | Isotridecy-3-(hydroxyphenyl) Proprionate | 1.00 | 0.400 | 0.2000 | SONGNOX 1077, Song won | Mw 460 |
| Silicone oil | PDMS, polydimethylsiloxane, trimethylsiloxy terminated | 96.64 | 38.656 | 39.3280 | Gelest Inc. | e.g., 50-5,000 cSt |
| Pigment | Gelest Black Pigment | 2.50 | 1.000 | 0.5000 | PGBLK01, Gelest Inc. | 55% pigment |
| | TOTAL A | 250.00 | 100.000 | | | |
| | | wt | wt % B | | | |
| V-PDMS | Vinyl terminated polydimethyl siloxane | 146.27 | 58.508 | | DMS V-35, Gelest Inc. | 5000 cSt |
| Crosslinker | Tetrakis (dimethylsiloxy) silane* (MH4Q) | 0.4470 | 0.179 | 0.0894 | SIT 7278.0, Gelest Inc. | 97% min |
| Chain extender | hydride teminated polydimethyl siloxane* | 3.2830 | 1.313 | 0.6566 | DMS-H03, Gelest Inc. | 2-3 cSt |
| Silicone oil | PDMS | 100.000 | 40.000 | | Gelest Inc. | e.g., 50-5,000 cSt |
| | TOTAL B | 250.00 | 100.000 | 100.0000 | | |
| | TOTAL A + B | 500.00 | | | | |

*Increased amounts of hydride from crosslinker and chain extender may be added to reach target hardness of about 110 g 1:1, while keeping MFHC at about 0.3-0.4.

Silicone gels were synthesized according to variations of Table 1. A first set of components was prepared. To prepare the first set of components, a platinum catalyst complex (platinum-divinyltetramethyldisiloxane complex; 3.0% Pt in vinyl terminated PDMS (SIP6830.3, Gelest, Inc.) is added first to a container. Vinyl-terminated polydimethylsiloxane (DMS-V35, Gelest, Inc.), 5,000 cSt, avg MW 49,500 g/mol, is then added and combined with the catalyst in a ratio of 100:0.101. A non-reactive silicone oil (e.g., DMS-T23, Gelest, Inc., 350 cSt; or DMS-T25, Gelest, Inc., 50 cSt) is added. Mixing is started at low rpm (100 rpm) and gradually increased to 500 rpm in 2 minutes, then mixing speed can be increased to 1200-1400 rpm for 3 minutes.

A second set of components was prepared by adding a vinyl-terminated polydimethylsiloxane (DMS-V35, Gelest, Inc.), 5,000 cSt, avg MW 49,500 g/mol, to a crosslinker, GELEST SIT 7278.0, a chain extender GELEST DMS-H03, and a non-reactive silicone oil. The crosslinker is added to the container first, because small variations in the added amount can greatly influence the hardness of the gel. An optional inhibitor may be added to the reaction container. The chain extender and non-reactive silicone oil is added. It is best to start mixing at low rpm (100 rpm). In 2 minutes go to 500 rpm and scrape off the sides of the container with a plastic rod. After this 2 minutes of mixing, the mixing speed can be increased to 1200-1400 rpm for 3 minutes.

The first set of components was mixed with the second set of components at ~1:1 ratio in a vial. The two sets of components were mixed at 1250 rpm for 2-3 minutes, placed under vacuum for 4-5 minutes, and poured into the desired mold. The resulting molded mixture was placed under vacuum for 3 minutes and then cured for 30 minutes at 90° C. Additional silicone gels were made of varying hardness by adding crosslinker and chain extender while maintaining MFHC of 0.3-0.4 to obtain silicone gels having harness of 80 g, 100 g, 110 g, and 120 g.

Example 2. Silicone Oil Gel Hardness and Compression Set Recovery

Silicone oil gels were made from formulations similar to that shown in Table 1, containing 5000 cP divinyl terminated polydimethyl siloxane, chain extender, cross linker (mole fraction of hydride as cross linker was —0.3-0.4) and 40% 50 cP non-reactive PDMS silicone fluid having three different H6Os values of 80 g, 100 g and 120 g. The hardness and the compression set recovery of the cured silicone gels is shown in FIG. 1. Each of the silicone oil gels had recovered most of its compression set within 5 minutes and had almost no residual compression set by 60 minutes. Specifically, each of the silicone gels in FIG. 1 exhibited a compression set recovery of no more than 10% compression set after 5 min; or no more than 5% compression set after 30 min. The rapid recovery of compression set was the physical property that allowed this gel formulation to seal a closure quickly (as fast as the closure could be assembled and tested) to 20 kPa pressure. The same closure was opened and resealed rapidly (within 5 minutes as well) and was able to seal to 20 kPa repeatedly (up to 17 times) after thermal cycling upon opening and closing each time for the resealing test. Closures made using the prior art silicone dry gel formulation failed this test, typically requiring up to 2 hours after opening and closing to reseal to 20 kPa pressure.

Example 3. Silicone Oil Gel Bleed Out

Figure 2:
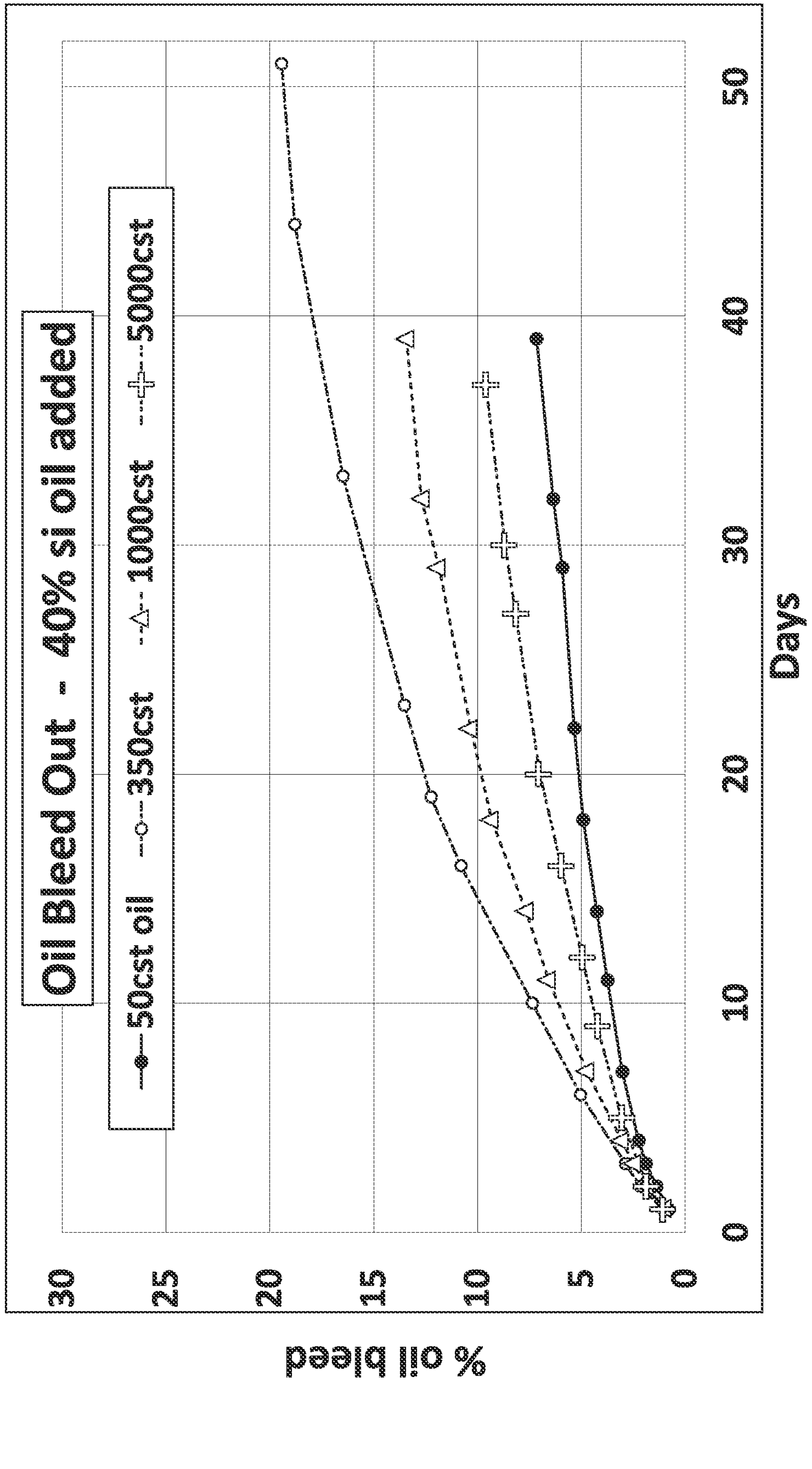
FIG. 2 shows a graph of oil bleed out for silicone oil gels having 40% by vol 50 cSt (A), 350 cSt (B), 1000 cSt (C), and 5000 cSt (D) non-reactive PDMS silicone extender oils over at least 37 days at 120 kPa at 70° C. Each of the silicone gels A, B, C exhibited no more than 15 wt % oil bleed out for up to 21 days, and no more than 20 wt % oil bleed out for up to 35 days.

Silicone gel compositions were prepared similar to Example 1, Table 1, except having 40% of different non-reactive PDMS silicone extender oils of various viscosities including 50 cSt, 350 cSt, 1000cSt, or 5000 cSt. Oil bleed out was tested for cured silicone oil gels at 120 kPa pressure at 70 degrees C. over 37 to 50 days. As shown in FIG. 2, each of the silicone gels exhibited no more than 15 wt % oil bleed out for up to 21 days. Each of the silicone gels exhibited no more than 20 wt % oil bleed out for up to 35 days. Surprisingly, the silicone gel employing lower viscosity 50 cSt PDMS extender oil exhibited lower oil bleed out than higher viscosity 350 cSt, 1000 cSt, or 5000 cSt non-reactive PDMS oils as shown in FIG. 2.

Example 4. Additional Test Plans for Oil Extended Silicone Gels

Additional process tests were performed as shown in Table 2.

TABLE 2

Additional Test Processes for Oil Extended Silicone Gels

| Test | Target Hardness (g) | Method and Conditions | Performance Evaluation | Notes |
|---|---|---|---|---|
| Process Test | | | | |
| Ratio Curve | NA | A:B from 1.00:0.90 to 1.00:1.20, use aluminum cups, 2 cups ea ratio, std cure conditions using FV fluid research machine | $H_{60\ s}$ | Plot 60 s hardness vs ratio, record initial hardness, ratio such that lowest B is 60 g, highest B is when curve is past the hardness peak |
| Material Tests | | | | |
| Relaxation | 60, 80, 100, 110, 120 | record 1 hour curves at $H_{60\ s}$ target hardness | Mathematical model of curve | record 1 hour curves at 60, 80, 100, 110, 120 H60 s target hardness, 2 cups each ratio |

TABLE 2-continued

| Additional Test Processes for Oil Extended Silicone Gels | | | | |
|---|---|---|---|---|
| Test | Target Hardness (g) | Method and Conditions | Performance Evaluation | Notes |
| Tensile and Elongation | 60, 70, 80, 90, 100, 110, 120, 130 g | Std test conditions | Tensile strength, elongation to break, compete curve | Need numerical values of curve for each hardness in excel, made 2 plaques each ratio |
| Tensile and Elongation after aging | 60, 80, 100, 120 g | Test after aging at 70° C. for 168 h | Tensile strength, elongation to break, compete curve | Need numerical values of curve for each hardness in excel, made 2 plaques each ratio |
| Extrusion Resistance | 60, 80, 100, 120 | 70° C., 24 hours | Size of bubble, does gel fracture? | After initial testing run all to 168 hours |
| Tear Resistance | 60, 70, 80, 90, 100, 110, 120, 130 g | Std test conditions | Strength and elongation to break, complete curve | Need numerical values of curve for each hardness in excel, made 3 plaques each ratio |
| Oil Bleed Out | 80, 100, 120 | 70° C., up to 1000 hours, 120 and 80 kPa | Loss of oil | 3 each hardness |
| Compression Set | 80, 100, 120 | 70° C., 22 h, 168 h, 336 h, 672 h, 1000 h | Initial value | Need to measure recovery rate up to 1 hour, 3 each hardness |
| Gel Aging stress relaxation | 100, 120 | 50° C., 75° C., 100° C., 125° C. aging for 1, 2, 4, 8, 16, 32, 64 days | Residual force after recovery | Need to take 7 sets of measurements, 2 each hardness, ea T |
| Gel Aging compression set | 100, 120 | 50° C., 75° C., 100° C., 125° C. aging for 1, 2, 4, 8, 16, 32, 64 days | Residual height after recovery | Same measurement set as above, height instead of force, use same samples |
| Gel Escape behavior various | 100 | 75° C. for 7 days | Bulging after recovery | Measure and photo each sample before and after recovery, various geometries of opening, 13 fixtures |

Silicone oil gels were prepared using A1 cups as provided herein using the target hardness and n number shown in Table 3.

TABLE 3

| Oil Extended Silicone Gels | | |
|---|---|---|
| Gel Needed | Target Hardness (g) | Number (n) |
| Al cups | 60 | 2 |
| | 80 | 2 |
| | 100 | 2 |
| | 110 | 2 |
| | 120 | 2 |
| Plaques | 60 | 8 |
| | 70 | 6 |
| | 80 | 8 |
| | 90 | 6 |
| | 100 | 8 |

TABLE 3-continued

| Oil Extended Silicone Gels | | |
|---|---|---|
| Gel Needed | Target Hardness (g) | Number (n) |
| | 110 | 6 |
| | 120 | 8 |
| | 130 | 6 |
| Extrusion | 60 | 4 |
| | 80 | 4 |
| | 100 | 4 |
| | 120 | 4 |
| Comp set | 80 | 16 |
| FV std | 100 | 16 |
| | 120 | 16 |
| Gel Aging | 100 | 40 |
| 2 × 2 × 2 cm | 120 | 40 |
| Klo test | | |

Oil Bleed Out

Oil bleed out was performed on two sets of oil extended silicone gels each having 40 wt % 50 cSt silicone oil at a target hardness of 80 g, 100 g, or 120 g, under 80 kPa over 112 days (Tables 4A, B, C), or under 120 kPa over 112 days (Tables 5A, B, C).

TABLE 4A

Oil Bleed Out 80 kPa Silicone Gel with 80 g Hardness; 50 cSt Silicone oil

| 80 g | Initial | 2 days | % change | 4 days | % change | 7 days | % change | 14 days | % change |
|---|---|---|---|---|---|---|---|---|---|
| 1 | 0.460 | 0.459 | 0.2174 | 0.456 | 0.8696 | 0.452 | 1.7391 | 0.446 | 3.0435 |
| 2 | 0.453 | 0.452 | 0.2208 | 0.450 | 0.6623 | 0.446 | 1.5453 | 0.441 | 2.6490 |
| 3 | 0.438 | 0.437 | 0.2283 | 0.435 | 0.6849 | 0.430 | 1.8265 | 0.426 | 2.7397 |
| AVG | | | 0.222 | | 0.739 | | 1.704 | | 2.811 |

| 21 days | % change | 30 days | % change | 56 days | % change | 85 days | % change | 112 days | % change |
|---|---|---|---|---|---|---|---|---|---|
| 0.442 | 3.9130 | 0.437 | 5.0000 | 0.429 | 6.7391 | 0.420 | 8.6957 | 0.413 | 10.2174 |
| 0.438 | 3.3113 | 0.431 | 4.8565 | 0.427 | 5.7395 | 0.423 | 6.6225 | 0.416 | 8.1678 |
| 0.422 | 3.6530 | 0.416 | 5.0228 | 0.412 | 5.9361 | 0.408 | 6.8493 | 0.396 | 9.5890 |
| AVG | 3.626 | | 4.960 | | 6.138 | | 7.389 | | 9.325 |

TABLE 4B

Oil Bleed Out 80 kPa Silicone Gel with 100 g Hardness; 50 cSt Silicone oil

| 100 g | Initial | 2 days | % change | 4 days | % change | 7 days | % change | 14 days | % change |
|---|---|---|---|---|---|---|---|---|---|
| 1 | 0.471 | 0.468 | 0.6369 | 0.466 | 1.0616 | 0.463 | 1.6985 | 0.459 | 2.5478 |
| 2 | 0.461 | 0.460 | 0.2169 | 0.457 | 0.8677 | 0.455 | 1.3015 | 0.450 | 2.3861 |
| 3 | 0.465 | 0.464 | 0.2151 | 0.461 | 0.8602 | 0.458 | 1.5054 | 0.455 | 2.1505 |
| AVG | | | 0.356 | | 0.930 | | 1.502 | | 2.361 |

| 21 days | % change | 30 days | % change | 56 days | % change | 85 days | % change | 112 days | % change |
|---|---|---|---|---|---|---|---|---|---|
| 0.457 | 2.9724 | 0.454 | 3.6093 | 0.442 | 6.1571 | 0.436 | 7.4310 | 0.432 | 8.2803 |
| 0.445 | 3.4707 | 0.442 | 4.1215 | 0.437 | 5.2061 | 0.432 | 6.2907 | 0.423 | 8.2430 |
| 0.452 | 2.7957 | 0.445 | 4.3011 | 0.437 | 6.0215 | 0.433 | 6.8817 | 0.428 | 7.9570 |
| AVG | 3.080 | | 4.011 | | 5.795 | | 6.868 | | 8.160 |

TABLE 4C

Oil Bleed Out 80 kPa Silicone Gel with 120 g Hardness; 50 cSt Silicone oil

| 120 g | Initial | 2 days | % change | 4 days | % change | 7 days | % change | 14 days | % change |
|---|---|---|---|---|---|---|---|---|---|
| 1 | 0.484 | 0.483 | 0.2066 | 0.480 | 0.8264 | 0.475 | 1.8595 | 0.470 | 2.8926 |
| 2 | 0.477 | 0.475 | 0.4193 | 0.472 | 1.0482 | 0.468 | 1.8868 | 0.465 | 2.5157 |
| 3 | 0.439 | 0.438 | 0.2278 | 0.437 | 0.4556 | 0.433 | 1.3667 | 0.428 | 2.5057 |
| AVG | | | 0.285 | | 0.777 | | 1.704 | | 2.638 |

| 21 days | % change | 30 days | % change | 56 days | % change | 85 days | % change | 112 days | % change |
|---|---|---|---|---|---|---|---|---|---|
| 0.466 | 3.7190 | 0.460 | 4.9587 | 0.454 | 6.1983 | 0.451 | 6.8182 | 0.446 | 7.8512 |
| 0.463 | 2.9350 | 0.458 | 3.9832 | 0.446 | 6.4990 | 0.444 | 6.9182 | 0.441 | 7.5472 |
| 0.426 | 2.9613 | 0.422 | 3.8724 | 0.412 | 6.1503 | 0.405 | 7.7449 | 0.398 | 9.3394 |
| | 3.205 | | 4.271 | | 6.283 | | 7.160 | | 8.246 |

The silicone gels exhibited no more than 10% oil bleed out after 120 days at 80 kPa pressure as shown in Tables 4A, B and C.

TABLE 5A

| Oil Bleed Out 120 kPa Silicone Gel with 80 g Hardness; 50 cSt Silicone oil | | | | | | | | | |
|---|---|---|---|---|---|---|---|---|---|
| 80 g | Initial | 2 days | % change | 4 days | % change | 7 days | % change | 14 days | % change |
| 1 | 0.483 | 0.478 | 1.0352 | 0.475 | 1.6563 | 0.471 | 2.4845 | 0.463 | 4.1408 |
| 2 | 0.471 | 0.468 | 0.6369 | 0.463 | 1.6985 | 0.460 | 2.3355 | 0.452 | 4.0340 |
| 3 | 0.480 | 0.478 | 0.4167 | 0.475 | 1.0417 | 0.468 | 2.5000 | 0.453 | 5.6250 |
| AVG | | | 0.696 | | 1.465 | | 2.440 | | 4.600 |
| 21 days | % change | 30 days | % change | 56 days | % change | 85 days | % change | 112 days | % change |
| 0.457 | 5.3830 | 0.451 | 6.6253 | 0.435 | 9.9379 | 0.428 | 11.3872 | 0.416 | 13.8716 |
| 0.445 | 5.5202 | 0.437 | 7.2187 | 0.426 | 9.5541 | 0.422 | 10.4034 | 0.417 | 11.4650 |
| 0.446 | 7.0833 | 0.441 | 8.1250 | 0.433 | 9.7917 | 0.427 | 11.0417 | 0.410 | 14.5833 |
| AVG | 5.996 | | 7.323 | | 9.761 | | 10.944 | | 13.307 |

TABLE 5B

| Oil Bleed Out 120 kPa Silicone Gel with 100 g Hardness; 50 cSt Silicone oil | | | | | | | | | |
|---|---|---|---|---|---|---|---|---|---|
| 100 g | Initial | 2 days | % change | 4 days | % change | 7 days | % change | 14 days | % change |
| 1 | 0.466 | 0.464 | 0.4292 | 0.459 | 1.5021 | 0.456 | 2.1459 | 0.446 | 4.2918 |
| 2 | 0.478 | 0.476 | 0.4184 | 0.470 | 1.6736 | 0.467 | 2.3013 | 0.460 | 3.7657 |
| 3 | 0.485 | 0.483 | 0.4124 | 0.479 | 1.2371 | 0.476 | 1.8557 | 0.469 | 3.2990 |
| AVG | | | 0.420 | | 1.471 | | 2.101 | | 3.786 |
| 21 days | % change | 30 days | % change | 56 days | % change | 85 days | % change | 112 days | % change |
| 0.443 | 4.9356 | 0.436 | 6.4378 | 0.428 | 8.1545 | 0.422 | 9.4421 | 0.410 | 12.0172 |
| 0.453 | 5.2301 | 0.444 | 7.1130 | 0.426 | 10.8787 | 0.420 | 12.1339 | 0.411 | 14.0167 |
| 0.463 | 4.5361 | 0.451 | 7.0103 | 0.435 | 10.3093 | 0.425 | 12.3711 | 0.417 | 14.0206 |
| AVG | 4.901 | | 6.854 | | 9.781 | | 11.316 | | 13.352 |

TABLE 5C

| Oil Bleed Out 120 kPa Silicone Gel with 120 g Hardness; 50 cSt Silicone oil | | | | | | | | | |
|---|---|---|---|---|---|---|---|---|---|
| 120 g | Initial | 2 days | % change | 4 days | % change | 7 days | % change | 14 days | % change |
| 1 | 0.472 | 0.466 | 1.2712 | 0.464 | 1.6949 | 0.460 | 2.5424 | 0.448 | 5.0847 |
| 2 | 0.446 | 0.442 | 0.8969 | 0.439 | 1.5695 | 0.435 | 2.4664 | 0.430 | 3.5874 |
| 3 | 0.456 | 0.452 | 0.8772 | 0.449 | 1.5351 | 0.444 | 2.6316 | 0.435 | 4.6053 |
| AVG | | | 1.015 | | 1.600 | | 2.547 | | 4.426 |
| 21 days | % change | 30 days | % change | 56 days | % change | 85 days | % change | 112 days | % change |
| 0.443 | 6.1441 | 0.439 | 6.9915 | 0.427 | 9.5339 | 0.423 | 10.3814 | 0.413 | 12.5000 |
| 0.423 | 5.1570 | 0.413 | 7.3991 | 0.403 | 9.6413 | 0.399 | 10.5381 | 0.392 | 12.1076 |
| 0.429 | 5.9211 | 0.425 | 6.7982 | 0.412 | 9.6491 | 0.407 | 10.7456 | 0.396 | 13.1579 |
| AVG | 5.741 | | 7.063 | | 9.608 | | 10.555 | | 12.589 |

The silicone gels exhibited no more than 15% oil bleed out after 120 days at 120 kPa pressure as shown in Tables 5A, B and C.

Compression Set

Compression set experiments were performed for extended silicone gels 40% 50 cSt silicone oil each having 40 wt % 50 cSt silicone oil at a target hardness of 80 g, 100 g, or 120 g, at 70° C. using 0.375" spacer, compression fixture cooled to room temperature before opening. Compression set data (% compression) after 22 hours, 7 days, 21 days, or 56 days are shown in Tables 6A to 9C.

TABLE 6A

| Compression Set (% Compression) after 22 hours, Silicone Gel 80 g hardness | | | | |
|---|---|---|---|---|
| | 22 Hours Compressed | | | |
| | 80 g hardness #1 | | 80 g hardness #2 | |
| | Initial height | | | |
| | 0.750 | | 0.740 | |
| | height | % compress | height | % compress |
| 5 min | 0.690 | 8.0 | 0.690 | 6.8 |
| 30 min | 0.720 | 4.0 | 0.720 | 2.7 |

TABLE 6A-continued

| Compression Set (% Compression) after 22 hours, Silicone Gel 80 g hardness | | | | |
|---|---|---|---|---|
| | 22 Hours Compressed | | | |
| | 80 g hardness #1 | | 80 g hardness #2 | |
| | Initial height | | | |
| | 0.750 | | 0.740 | |
| | height | % compress | height | % compress |
| 60 min | 0.720 | 4.0 | 0.725 | 2.0 |
| 24 hr | 0.745 | 0.7 | 0.740 | 0.0 |

TABLE 6B

| Compression Set (% Compression) after 22 hours, Silicone Gel 100 g hardness | | | | | | |
|---|---|---|---|---|---|---|
| | 22 Hours Compressed | | | | | |
| | 100 g hardness #1 | | 100 g hardness #2 | | 100 g hardness #3 | |
| | Initial height | | | | | |
| | 0.755 | | 0.750 | | 0.750 | |
| | height | % compress | height | % compress | height | % compress |
| 5 min | 0.705 | 6.6 | 0.700 | 6.7 | 0.710 | 5.3 |
| 30 min | 0.720 | 4.6 | 0.720 | 4.0 | 0.720 | 4.0 |
| 60 min | 0.735 | 2.6 | 0.730 | 2.7 | 0.730 | 2.7 |
| 24 hr | 0.750 | 0.7 | 0.745 | 0.7 | 0.750 | 0.0 |

TABLE 6C

| Compression Set (% Compression) after 22 hours, Silicone Gel 120 g hardness | | | | |
|---|---|---|---|---|
| | 22 Hours Compressed | | | |
| | 120 g hardness #1 | | 120 g hardness #2 | |
| | Initial height | | | |
| | 0.745 | | 0.740 | |
| | height | % compress | height | % compress |
| 5 min | 0.705 | 5.4 | 0.695 | 6.1 |
| 30 min | 0.715 | 4.0 | 0.710 | 4.1 |
| 60 min | 0.725 | 2.7 | 0.720 | 2.7 |
| 24 hr | 0.740 | 0.7 | 0.735 | 0.7 |

Compression set results (% compression) after 7 days are shown in Tables 7A, B, C.

TABLE 7A

| Compression Set (% Compression) after 7 days, Silicone Gel 80 g hardness | | | | |
|---|---|---|---|---|
| | 7 Days Compressed | | | |
| | 80 g hardness #1 | | 80 g hardness #2 | |
| | Initial height | | | |
| | 0.735 | | 0.740 | |
| | height | % compress | height | % compress |
| 5 min | 0.665 | 9.5 | 0.675 | 8.8 |
| 30 min | 0.685 | 6.8 | 0.695 | 6.1 |
| 60 min | 0.700 | 4.8 | 0.705 | 4.7 |

TABLE 7A-continued

| Compression Set (% Compression) after 7 days, Silicone Gel 80 g hardness | | | | |
|---|---|---|---|---|
| | 7 Days Compressed | | | |
| | 80 g hardness #1 | | 80 g hardness #2 | |
| | Initial height | | | |
| | 0.735 | | 0.740 | |
| | height | % compress | height | % compress |
| 3 hr | 0.710 | 3.4 | 0.715 | 3.4 |
| 24 hr | 0.720 | 2.0 | 0.725 | 2.0 |

TABLE 7B

| Compression Set (% Compression) after 7 days, Silicone Gel 100 g hardness | | | | |
|---|---|---|---|---|
| | 7 Days Compressed | | | |
| | 100 g hardness #1 | | 100 g hardness #2 | |
| | Initial height | | | |
| | 0.755 | | 0.740 | |
| | height | % compress | height | % compress |
| 5 min | 0.690 | 8.6 | 0.685 | 7.4 |
| 30 min | 0.715 | 5.3 | 0.700 | 5.4 |
| 60 min | 0.725 | 4.0 | 0.715 | 3.4 |
| 3 hr | 0.730 | 3.3 | 0.720 | 2.7 |
| 24 hr | 0.735 | 2.6 | 0.725 | 2.0 |

TABLE 7C

| Compression Set (% Compression) after 7 days, Silicone Gel 120 g hardness | | | | | | |
|---|---|---|---|---|---|---|
| | 7 Days Compressed | | | | | |
| | 120 g hardness #1 | | 120 g hardness #2 | | 120 g hardness #3 | |
| | Initial height | | | | | |
| | 0.740 | | 0.740 | | 0.730 | |
| | height | % compress | height | % compress | height | % compress |
| 5 min | 0.690 | 6.8 | 0.685 | 7.4 | 0.680 | 6.8 |
| 30 min | 0.700 | 5.4 | 0.700 | 5.4 | 0.695 | 4.8 |
| 60 min | 0.710 | 4.1 | 0.710 | 4.1 | 0.705 | 3.4 |
| 3 hr | 0.720 | 2.7 | 0.715 | 3.4 | 0.710 | 2.7 |
| 24 hr | 0.725 | 2.0 | 0.725 | 2.0 | 0.715 | 2.1 |

Compression set results (% compression) after 21 days are shown in Tables 8A, B, C.

TABLE 8A

| Compression Set (% Compression) after 21 days, Silicone Gel 80 g hardness | | | | |
|---|---|---|---|---|
| | 21 Days Compressed | | | |
| | 80 g hardness #1 | | 80 g hardness #2 | |
| | Initial height | | | |
| | 0.745 | | 0.740 | |
| | height | % compress | height | % compress |
| 5 min | 0.680 | 8.7 | 0.670 | 9.5 |
| 30 min | 0.695 | 6.7 | 0.695 | 6.1 |
| 60 min | 0.710 | 4.7 | 0.700 | 5.4 |
| 3 hr | 0.715 | 4.0 | 0.705 | 4.7 |
| 24 hr | 0.730 | 2.0 | 0.720 | 2.7 |

TABLE 8B

| Compression Set (% Compression) after 21 days, Silicone Gel 100 g hardness | | | | | | |
|---|---|---|---|---|---|---|
| | 21 Days Compressed | | | | | |
| | 100 g hardness #1 | | 100 g hardness #2 | | 100 g hardness #3 | |
| | Initial height | | | | | |
| | 0.750 | | 0.755 | | 0.745 | |
| | height | % compress | height | % compress | height | % compress |
| 5 min | 0.685 | 8.7 | 0.685 | 9.3 | 0.685 | 8.1 |
| 30 min | 0.705 | 6.0 | 0.700 | 7.3 | 0.705 | 5.4 |
| 60 min | 0.710 | 5.3 | 0.710 | 6.0 | 0.710 | 4.7 |
| 3 hr | 0.720 | 4.0 | 0.715 | 5.3 | 0.715 | 4.0 |
| 24 hr | 0.735 | 2.0 | 0.730 | 3.3 | 0.730 | 2.0 |

TABLE 8C

| Compression Set (% Compression) after 21 days, Silicone Gel 120 g hardness | | | | |
|---|---|---|---|---|
| | 21 Days Compressed | | | |
| | 120 g hardness #1 | | 120 g hardness #2 | |
| | Initial height | | | |
| | 0.745 | | 0.750 | |
| | height | % compress | height | % compress |
| 5 min | 0.680 | 8.7 | 0.685 | 8.7 |
| 30 min | 0.700 | 6.0 | 0.700 | 6.7 |
| 60 min | 0.705 | 5.4 | 0.705 | 6.0 |
| 3 hr | 0.710 | 4.7 | 0.715 | 4.7 |
| 24 hr | 0.720 | 3.4 | 0.725 | 3.3 |

Compression set results (% compression) after 56 days are shown in Tables 9A, B, C.

TABLE 9A

| Compression Set (% Compression) after 56 days, Silicone Gel 80 g hardness | | | | |
|---|---|---|---|---|
| | 56 Days Compressed | | | |
| | 80 g hardness #1 | | 80 g hardness #2 | |
| | Initial height | | | |
| | 0.740 | | 0.745 | |
| | height | % compress | height | % compress |
| 5 min | 0.660 | 10.8 | 0.660 | 11.4 |
| 30 min | 0.690 | 6.8 | 0.685 | 8.1 |

TABLE 9A-continued

| Compression Set (% Compression) after 56 days, Silicone Gel 80 g hardness | | | | |
|---|---|---|---|---|
| | 56 Days Compressed | | | |
| | 80 g hardness #1 | | 80 g hardness #2 | |
| | Initial height | | | |
| | 0.740 | | 0.745 | |
| | height | % compress | height | % compress |
| 60 min | 0.700 | 5.4 | 0.695 | 6.7 |
| 3 hr | 0.710 | 4.1 | 0.710 | 4.7 |
| 24 hr | 0.720 | 2.7 | 0.720 | 3.4 |

TABLE 9B

| Compression Set (% Compression) after 56 days, Silicone Gel 100 g hardness | | | | |
|---|---|---|---|---|
| | 56 Days Compressed | | | |
| | 100 g hardness #1 | | 100 g hardness #2 | |
| | Initial height | | | |
| | 0.740 | | 0.750 | |
| | height | % compress | height | % compress |
| 5 min | 0.660 | 10.8 | 0.670 | 10.7 |
| 30 min | 0.685 | 7.4 | 0.695 | 7.3 |
| 60 min | 0.690 | 6.8 | 0.705 | 6.0 |
| 3 hr | 0.700 | 5.4 | 0.715 | 4.7 |
| 24 hr | 0.710 | 4.1 | 0.725 | 3.3 |

TABLE 9C

| Compression Set (% Compression) after 56 days, Silicone Gel 120 g hardness | | | | | | |
|---|---|---|---|---|---|---|
| | 56 Days Compressed | | | | | |
| | 120 g hardness #1 | | 120 g hardness #2 | | 120 g hardness #3 | |
| | Initial height | | | | | |
| | 0.750 | | 0.735 | | 0.745 | |
| | height | % compress | height | % compress | height | % compress |
| 5 min | 0.680 | 9.3 | 0.665 | 9.5 | 0.675 | 9.4 |
| 30 min | 0.700 | 6.7 | 0.690 | 6.1 | 0.695 | 6.7 |
| 60 min | 0.710 | 5.3 | 0.695 | 5.4 | 0.700 | 6.0 |
| 3 hr | 0.720 | 4.0 | 0.705 | 4.1 | 0.710 | 4.7 |
| 24 hr | 0.730 | 2.7 | 0.715 | 2.7 | 0.720 | 3.4 |

The extended silicone gels of the disclosure after being under compression at 70° C. for up to 56 days exhibit <20%, <12%, <10%, <5%, or <4% or from 0 to 20%, 0 to 12%, 0 to 5%, or 0 to 4% compression set after 24 hr recovery time.

The extended silicone gels of the disclosure after being under compression at 70° C. for up to 56 days exhibit <20%, <15%, or <12%, or from 0 to 20%, 2 to 20%, or 4 to 12% compression set after 5 min recovery time.

The extended silicone gels each having 40 wt % of a 50 cSt silicone oil at a target hardness of 80 g, 100 g, or 120 g, after being under compression at 70° C. for up to 56 days exhibit 0 to 20%, 2 to 20%, or 2 to 12% compression set, or <20%, or <15% compression set.

The extended silicone gels each having 40 wt % of a 50 cSt silicone oil at a target hardness of 80 g, 100 g, or 120 g, after being under compression at 70° C. for up to 56 days exhibit <15%, <12%, <10%, or <9%, or from 0 to 20%, 1 to 15%, or 2 to 12%, at 30 min recovery time.

The extended silicone gels each having 40 wt % of a 50 cSt silicone oil at a target hardness of 80 g, 100 g, or 120 g, after being under compression at 70° C. for up to 56 days exhibit <8%, or <7%, or from 1 to 8%, or 2 to 7% compression set, at 60 min recovery time.

The extended silicone gels each having 40 wt % of a 50 cSt silicone oil at a target hardness of 80 g, 100 g, or 120 g, after being under compression at 70° C. for up to 56 days exhibit <6%, or <5%, or from 0 to 6%, or 0.5 to 5% compression set at 24 hours recovery time.

Extrusion Resistance

Extrusion resistance experiments were run on extended silicone gels made with 40% 50 cSt silicone oil having a target hardness of 60 g, 80 g, 100 g, or 120 g at 70° C. at 25 psi, at 24 hours and 168 hours to determine the size of the bubble, and does the gel fracture. Two gels of each hardness are run. Results: After 1 week at 70° C., under 25 psi, the 120 g gel exhibited a silicone gel bubble about 4 mm in diameter, protruding 2-3 mm from the device. After 1 week at 70° C., under 25 psi, the 80 g gel exhibited a silicone gel bubble about 7 mm in diameter, protruding 5-6 mm from the device.

Tensile and Elongation Testing

Tensile and elongation testing was performed on extended silicone gels made with 40% 50 cSt silicone oil having target hardness' of 60, 70, 80, 90, 100, 110, 120, or 130 g, e.g., for tensile elongation using ASTM D638, or as described herein. Tensile strength, elongation to break, and compete curve were determined, under standard test conditions using 2 plaques each ratio. Elongation test results are shown in Table 10A. Aged extended silicone gel samples were also tested. Plaques were aged 1 week (168 h) at 70° C. before blanking out gel rings for testing. Aged elongation test results are shown in Table 10B.

TABLE 10A

Extended Silicone Gel Elongation Results Summary

| Gel Ratio A:B | 60 sec Hardness (g) | Maximum Load [N] | ELONGATION [%] | Tensile strain (Extension) at Maximum Load [%] | Tensile extension at Maximum Load [mm] |
|---|---|---|---|---|---|
| 1.08:1 | 68.2 | 1.710 | 1660 | 1648 | 419 |
| 1.07:1 | 76.2 | 1.508 | 1400 | 1391 | 353 |
| 1.05:1 | 83.4 | 1.572 | 1234 | 1227 | 312 |
| 1.03:1 | 98.4 | 1.644 | 1077 | 1071 | 272 |
| 1.02:1 | 106.0 | 1.768 | 1144 | 1140 | 289 |
| 1:1 | 118.0 | 1.790 | 985 | 980 | 249 |
| 1:1.01 | 129.8 | 1.554 | 814 | 810 | 206 |
| 1:1.02 | 138.8 | 1.861 | 869 | 863 | 219 |

TABLE 10B

Aged Extended Silicone Gel Elongation Results Summary

| Gel Ratio | 60 sec Hardness (g) | Maximum Load [N] | ELONGATION [%] | Tensile strain (Extension) at Maximum Load [%] | Tensile extension at Maximum Load [mm] |
|---|---|---|---|---|---|
| 1.08:1 | 68.2 | 1.875 | 1698 | 1689 | 429 |
| 1.05:1 | 83.4 | 1.613 | 1260 | 1250 | 317 |
| 1.02:1 | 106.0 | 1.850 | 1214 | 1206 | 306 |
| 1:1.01 | 129.8 | 1.768 | 937 | 930 | 236 |

Elongation data for filled (20% R8200 silica) (and unfilled extended silicone gels (40%, 50 cSt non-reactive PDMS silicone oil) is shown in Table 10C. The extended silicone gels were filled with 20 wt % fumed silica, surface modified with silanes, R8200 (Evonik).

TABLE 10C

Filled and Unfilled Extended Silicone Gel Elongation

| Gel | 60 sec Hardness (g) | Maximum Load [N] | ELONGATION [%] | Tensile strain (Extension) at Maximum Load [%] | Tensile extension at Maximum Load [mm] |
|---|---|---|---|---|---|
| 20% R8200 silica | 100.6 | 8.426 | 2015 | 2007 | 510 |
| 1.02:1 (40% 50 cst) | 106.0 | 1.768 | 1145 | 1140 | 289 |

The extended silicone gels exhibited >1000% elongation (unfilled), or >1500% elongation when filled with 20% R8200 silica.

Hardness Testing

Extended gels were prepared according to the disclosure having 40 wt % of 50 cSt non-reactive PDMS silicone oil. The gels were cured at 90° C. for 10 min, or for an otherwise specified period of time. 60 sec Hardness was measured using texture analyzer as provided herein. Table 11A shows change in 60 sec hardness after cure for 10 min at 90° C. for four extended silicone gels at 1 hr after cure and 6 days after cure and the increase in 60 sec hardness.

TABLE 11A

Change in 60 sec Hardness from 1 hour to 6 days after cure

| Ratio A:B | | 1 hour after cure | | 6 days after cure | | Increase in 60 s hardness | |
|---|---|---|---|---|---|---|---|
| | | 4 mm | 60 sec | 4 mm | 60 sec | grams | % |
| 1.08:1 | #1 | 108.8 | 65.0 | 106.6 | 68.6 | 3.6 | 5.5 |
| | #2 | 107.4 | 65.0 | 111.0 | 68.8 | 3.8 | 5.8 |
| 1.05:1 | #1 | 121.2 | 81.2 | 131.0 | 85.8 | 4.6 | 5.7 |
| | #2 | 120.8 | 81.4 | 127.0 | 87.0 | 5.6 | 6.9 |
| 1.02:1 | #1 | 148.0 | 100.8 | 152.6 | 109.8 | 9.0 | 8.9 |
| | #2 | 148.2 | 101.2 | 152.6 | 109.4 | 8.2 | 8.1 |
| 1:1.01 | #1 | 167.4 | 117.4 | 117.4 | 129.6 | 12.2 | 10.4 |
| | #2 | 167.6 | 118.2 | 118.2 | 130.6 | 12.4 | 10.5 |

The 60 sec hardness increased from 5% to 11% between 1 hour and 6 days after cure for each of the extended silicone gels.

Table 11B shows 60 sec hardness vs. time at two different cure times.at 90 deg C for 15 min or 60 min.

TABLE 11B 60 sec Hardness vs. Time at 2 different cure times

| | 90° C. 15 min | 90° C. 60 min |
|---|---|---|
| 1 hr | 97.2 | 97.2 |
| 20 hr | 103.2 | 99.8 |
| 44 hr | 103.6 | 101.2 |
| 5 days | 105.6 | 102.0 |

Table 11C shows gel hardness vs. time after cure for four different extended silicone gels made with 40% 50 cSt silicone oil.

TABLE 11C

Extended silicone gel hardness vs. time after cure

| Ratio | | 1 hour after cure | | 2 hours after cure | | 4 hours after cure | |
|---|---|---|---|---|---|---|---|
| | | 4 mm | 60 sec | 4 mm | 60 sec | 4 mm | 60 sec |
| 1.08:1 | #1 | 100.0 | 62.8 | 107.0 | 64.6 | 107.2 | 64.8 |
| | #2 | 104.2 | 62.4 | 106.0 | 64.0 | 105.4 | 64.4 |
| 1.05:1 | #1 | 124.8 | 80.0 | 128.4 | 81.2 | 127.4 | 82.0 |
| | #2 | 124.2 | 80.2 | 127.4 | 80.4 | 127.2 | 82.4 |
| 1.02:1 | #1 | 145.8 | 100.0 | 149.0 | 102.4 | 146.0 | 103.4 |
| | #2 | 142.6 | 99.8 | 148.0 | 102.2 | 148.4 | 103.0 |
| 1:1.01 | #1 | 163.2 | 116.4 | 169.4 | 119.6 | 171.0 | 121.6 |
| | #2 | 167.0 | 117.6 | 164.4 | 119.6 | 168.4 | 121.6 |

TABLE 11C-continued

Extended silicone gel hardness vs. time after cure

| Ratio | | 24 hours after cure | | 48 hours after cure | |
|---|---|---|---|---|---|
| | | 4 mm | 60 sec | 4 mm | 60 sec |
| 1.08:1 | #1 | 108.0 | 67.0 | 111.2 | 69.0 |
| | #2 | 108.0 | 66.8 | 111.0 | 67.6 |
| 1.05:1 | #1 | 129.2 | 84.8 | 130.8 | 86.2 |
| | #2 | 128.8 | 84.8 | 131.0 | 85.4 |
| 1.02:1 | #1 | 151.8 | 107.8 | 156.6 | 109.2 |
| | #2 | 155.0 | 107.8 | 155.4 | 109.0 |
| 1:1.01 | #1 | 177.4 | 127.4 | 180.2 | 129.8 |
| | #2 | 179.6 | 129.2 | 180.8 | 130.4 |

Table 11D shows the 60 minute (3600 seconds) hardness curve for 8 extended silicone gels having 40% silicone oil over time.

TABLE 11D 60 minute (3600 seconds) hardness curve for 8 extended silicone gels

| | Ration A:B | | | |
|---|---|---|---|---|
| Time (seconds | 1.08:1 Hardness (g) | 1.07:1 Hardness (g) | 1.05:1 Hardness (g) | 1.03:1 Hardness (g) |
| 2 (4 mm) | 110.2 | 113.8 | 127.6 | 137.0 |
| 60 | 68.2 | 76.2 | 83.4 | 98.4 |
| 120 | 65.4 | 73.0 | 80.4 | 95.0 |
| 180 | 64.0 | 71.4 | 78.6 | 93.6 |
| 240 | 63.0 | 70.4 | 77.4 | 92.0 |
| 300 | 62.4 | 69.4 | 76.6 | 91.0 |
| 600 | 60.6 | 67.6 | 74.8 | 89.0 |
| 900 | 59.4 | 66.2 | 73.2 | 88.2 |
| 1800 | 58.4 | 64.4 | 71.0 | 86.4 |
| 2700 | 56.6 | 63.8 | 68.4 | 85.0 |
| 3600 | 56.2 | 63.0 | 67.2 | 84.2 |

| | Ratio A:B | | | |
|---|---|---|---|---|
| Time (seconds | 1.02:1 Hardness (g) | 1:1 Hardness (g) | 1:1.01 Hardness (g) | 1:1.02 Hardness (g) |
| 2 (4 mm) | 152.2 | 170.0 | 176.4 | 188.8 |
| 60 | 106.0 | 118.0 | 129.8 | 138.8 |
| 120 | 102.8 | 115.4 | 126.0 | 134.8 |
| 180 | 100.2 | 113.8 | 124.4 | 133.0 |
| 240 | 98.8 | 112.2 | 123.0 | 131.8 |
| 300 | 98.6 | 111.0 | 121.8 | 130.8 |
| 600 | 96.0 | 109.2 | 119.2 | 128.4 |
| 900 | 94.6 | 107.8 | 117.6 | 127.0 |
| 1800 | 92.4 | 106.6 | 114.6 | 123.4 |
| 2700 | 91.8 | 104.6 | 112.6 | 121.2 |
| 3600 | 90.8 | 104.2 | 112.0 | 120.0 |

For the silicone gels of the disclosure, as the ratio of A:B decreases, the hardness of the gel increases.

What is claimed is:

1. A method of making a silicone gel comprising:

providing a first set of components comprising: (1) a base polymer having a vinyl-silicone group, (2) an addition cure catalyst, and optionally (3) a non-reactive silicone oil;

providing a second set of components comprising: (1) a crosslinker having three or four Si-H hydride moieties, (2) additional base polymer having a vinyl-silicone group, and optionally (3) a non-reactive silicone oil, wherein the second set of components further comprises a chain extender having two Si-H hydride moieties per molecule, wherein the mole fraction hydride present as crosslinker (MFHC) is from about 0.2 to about 0.5, and wherein the first and/or second set of components comprises the non-reactive silicone oil;

mixing the first and second set of components together to form a silicone gel composition; and molding and curing the silicone gel composition to form the silicone gel.

2. The method of claim 1, wherein the first and second set of components comprises the non-reactive silicone oil.

3. The method of claim 1, wherein the non-reactive silicone oil is a trimethylsiloxy-terminated or silanol-terminated polydialkylsiloxane.

4. The method of claim 1, wherein the non-reactive silicone oil has a kinematic viscosity measured at 25 deg C in a range of 10-30,000 cSt (10-30,000 mm2/s).

5. The method of claim 1, wherein the silicone gel composition comprises 10-60 wt % of the non-reactive silicone oil.

6. The method of claim 1, wherein the base polymer and additional base polymer are each a vinyl-terminated polydimethylsiloxane.

7. The method of claim 1, wherein the base polymer and additional base polymer each have one or more of the following properties: (a) a molecular weight between 6,000 g/mol and 170,000 g/mol; (b) a kinematic viscosity measured at 25 deg C between 100 mm2/s and 165,000 mm2/s; and (c) a vinyl content between 0.01 eq/kg and 0.1 eq/kg.

8. The method of claim 1, wherein the silicone gel composition comprises the base polymer and the additional base polymer in an amount between 40-90 wt %.

9. The method of claim 1, wherein the mole fraction hydride present as crosslinker (MFHC) is from about 0.3 to about 0.4.

10. The method of claim 1, wherein the hydride to vinyl ratio in the silicone gel composition is between 0.8 and 1.0.

11. The method of claim 1, wherein the crosslinker is selected from the group consisting of tetrakis(dimethylsiloxy)silane, methyltris(dimethylsiloxy)silane, phenyltris(dimethylsiloxy)silane and combinations thereof.

12. The method of claim 1, wherein the chain extender is selected from the group consisting of hydride containing polydimethylsiloxane, dihydride containing siloxane, hydride terminated polydimethylsiloxane, hydride terminated polyphenylmethylsiloxane, hydride terminated polydiphenylsiloxane, functionalized terminated silicone, and combinations thereof.

13. The method of claim 1, wherein the catalyst is selected from the group consisting of platinum complexed with divinyltetramethyldisiloxane, and rhodium chloride complex.

14. The method of claim 1, wherein the weight ratio between the first set of components and the second set of components is between 1.10:1.0 and 1.0:1.10.

15. The method of claim 1, wherein the silicone gel comprises one or more of the following properties: (a) a hardness between 50 g and 200 g; (b) a compression set between 2% and 20% after 50% strain has applied to the gel for 1000 hours at 70° C. as measured under ASTM D395, Method B; (c) a compression set recovery of no more than 12% compression set after 5 min; (d) no more than 15% oil bleed out after being under compression of 1.2 atm for 21 days at 70° C., and (e) a $H_{60s}$ hardness of from 80 g to 120 g.

16. A silicone gel prepared from a silicone gel composition comprising: a base polymer having a vinyl-silicone group; a catalyst; a crosslinker having three or four Si-H hydride moieties; a chain extender having two Si-H hydride moieties; and a non-reactive silicone oil, wherein the mole fraction hydride present as crosslinker (MFHC) is from about 0.2 to about 0.5.

17. A sealant for use in an enclosure to seal cable entry/exit locations, the sealant comprising:

a sealant material having:

a residual indentation hardness ranging from 20 g-150 g;

a compression set of less than 10% after 30 minutes of recovery time as measured under ASTM D395, Method B;

an elongation to failure of at least 500% as measured under ASTM D638; and a resistance to extrusion having a measured volume of no more than 0.5 $cm^3$.

* * * * *